US010373064B2

(12) United States Patent
Mascaro et al.

(10) Patent No.: US 10,373,064 B2
(45) Date of Patent: Aug. 6, 2019

(54) METHOD AND SYSTEM FOR ADJUSTING ANALYTICS MODEL CHARACTERISTICS TO REDUCE UNCERTAINTY IN DETERMINING USERS' PREFERENCES FOR USER EXPERIENCE OPTIONS, TO SUPPORT PROVIDING PERSONALIZED USER EXPERIENCES TO USERS WITH A SOFTWARE SYSTEM

(71) Applicant: Intuit Inc., Mountain View, CA (US)

(72) Inventors: Massimo Mascaro, San Diego, CA (US); Joseph Cessna, San Diego, CA (US); Peter Ouyang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 725 days.

(21) Appl. No.: 14/991,619

(22) Filed: Jan. 8, 2016

(65) Prior Publication Data

US 2017/0200087 A1 Jul. 13, 2017

(51) Int. Cl.
*G06N 5/02* (2006.01)
*G06N 7/00* (2006.01)
(Continued)

(52) U.S. Cl.
CPC .............. *G06N 7/005* (2013.01); *G06N 5/02* (2013.01); *G06Q 20/14* (2013.01); *G06Q 40/12* (2013.12)

(58) Field of Classification Search
USPC .......................................................... 706/46
See application file for complete search history.

(56) References Cited

U.S. PATENT DOCUMENTS 6,922,488 B2 7/2005 Mastrianni et al.
6,973,418 B1 12/2005 Kirshenbaum
(Continued)

FOREIGN PATENT DOCUMENTS

WO WO 2016/039779 3/2016

OTHER PUBLICATIONS

ScienceDirect Trends in Ecology & Evolution vol. 22, Issue 1, Jan. 2007, pp. 42-47 Ensemble forecasting of species distributions Miguel B. Araújo, Mark New.*
(Continued)

*Primary Examiner* — Michael B Holmes
(74) *Attorney, Agent, or Firm* — Hawley Troxell Ennis & Hawley LLP; Philip McKay

(57) ABSTRACT

A method and system adaptively improves potential customer conversion rates, revenue metrics, and/or other target metrics by providing effective user experience options, from a variety of different user experience options, to some users while concurrently testing user responses to other user experience options, according to one embodiment. The method and system selects the user experience options by applying user characteristics data to an analytics model, according to one embodiment. The characteristics of the analytics model are adjusted and/or tuned to control/reduce uncertainty in identifying effective user experience options, according to one embodiment. The method and system analyzes user responses to the user experience options to update the analytics model, and to dynamically adapt the personalization of the user experience options, at least partially based on feedback from users, according to one embodiment.

25 Claims, 15 Drawing Sheets

(51) Int. Cl.
*G06Q 20/14* (2012.01)
*G06Q 40/00* (2012.01)

(56) References Cited

U.S. PATENT DOCUMENTS

| | | | |
|---|---|---|---|
| 7,788,137 B1 | 8/2010 | Tifford | |
| 7,797,166 B1 | 9/2010 | Bradley et al. | |
| 8,090,794 B1 | 1/2012 | Kilat et al. | |
| 8,099,309 B1 | 1/2012 | Bober | |
| 8,190,499 B1 | 5/2012 | McVickar | |
| 8,407,113 B1 | 3/2013 | Eftekhari et al. | |
| 8,490,018 B2 | 7/2013 | Carter et al. | |
| 8,768,313 B2 | 7/2014 | Rodriguez | |
| 8,806,444 B1 | 8/2014 | Podgorny et al. | |
| 8,909,568 B1 | 12/2014 | Mann et al. | |
| 9,355,650 B2 | 5/2016 | Dimitriadis et al. | |
| 9,378,065 B2 | 6/2016 | Shear et al. | |
| 9,442,827 B2* | 9/2016 | Mascaro | G06F 9/5066 |
| 9,444,824 B1 | 9/2016 | Balazs et al. | |
| 9,484,044 B1* | 11/2016 | Mascaro | G10L 21/0232 |
| 9,530,434 B1* | 12/2016 | Mascaro | G10L 25/90 |
| 9,648,171 B1 | 5/2017 | Eftekhari et al. | |
| 9,870,785 B2* | 1/2018 | Bradley | G10L 25/90 |
| 9,891,792 B1* | 2/2018 | Morin | G06F 16/285 |
| 9,922,668 B2* | 3/2018 | Bradley | G10L 25/90 |
| 9,983,859 B2* | 5/2018 | Mascaro | G06F 8/60 |
| 9,990,544 B1* | 6/2018 | Uribe | G06K 9/00469 |
| 10,013,721 B1* | 7/2018 | Laaser | G06Q 40/123 |
| 10,162,734 B1* | 12/2018 | Podgorny | G06F 11/366 |
| 10,169,828 B1* | 1/2019 | Morin | G06Q 40/123 |
| 10,176,534 B1* | 1/2019 | Mascaro | G06Q 40/123 |
| 10,204,382 B2* | 2/2019 | Morin | G06Q 40/123 |
| 2002/0152457 A1 | 10/2002 | Jahnke | |
| 2003/0144868 A1 | 7/2003 | MacIntyre et al. | |
| 2006/0143093 A1 | 6/2006 | Brandt et al. | |
| 2006/0155632 A1 | 7/2006 | Cherkas et al. | |
| 2006/0294084 A1 | 12/2006 | Patel et al. | |
| 2008/0071703 A1 | 3/2008 | Evans | |
| 2008/0127127 A1 | 5/2008 | Chitgupakar et al. | |
| 2008/0147494 A1 | 6/2008 | Larson | |
| 2009/0106178 A1 | 4/2009 | Chu | |
| 2009/0313086 A1 | 12/2009 | Lee et al. | |
| 2011/0264569 A1 | 10/2011 | Houseworth et al. | |
| 2011/0288868 A1 | 11/2011 | Lloyd et al. | |
| 2012/0109792 A1 | 5/2012 | Eftekhari et al. | |
| 2013/0198047 A1 | 8/2013 | Houseworth et al. | |
| 2013/0268468 A1 | 10/2013 | Vijayaraghavan et al. | |
| 2013/0282539 A1 | 10/2013 | Murray | |
| 2014/0067518 A1 | 3/2014 | McGovern | |
| 2014/0068600 A1 | 3/2014 | Ashok et al. | |
| 2014/0075336 A1 | 3/2014 | Curtis et al. | |
| 2014/0122381 A1 | 5/2014 | Nowozin | |
| 2014/0201045 A1 | 7/2014 | Pai et al. | |
| 2014/0359261 A1 | 12/2014 | Collins et al. | |
| 2015/0227962 A1 | 8/2015 | Wical et al. | |
| 2016/0012350 A1 | 1/2016 | Narayanan et al. | |
| 2016/0098804 A1 | 4/2016 | Mascaro et al. | |
| 2016/0103667 A1 | 4/2016 | Chen et al. | |
| 2016/0180470 A1* | 6/2016 | Mascaro | G06Q 40/123 705/7.38 |
| 2016/0217534 A1* | 7/2016 | Goldman | G06Q 40/123 |
| 2016/0247239 A1 | 8/2016 | Houseworth et al. | |
| 2016/0267397 A1 | 9/2016 | Carlsson | |
| 2016/0350870 A1* | 12/2016 | Morin | G06Q 40/123 |
| 2017/0090893 A1 | 3/2017 | Aditya et al. | |
| 2017/0178199 A1* | 6/2017 | Cessna | G06Q 40/123 |
| 2017/0186097 A1* | 6/2017 | Mascaro | G06Q 40/123 |
| 2017/0200087 A1* | 7/2017 | Mascaro | G06Q 40/12 |
| 2017/0300933 A1* | 10/2017 | Mascaro | G06Q 40/123 |
| 2017/0308960 A1* | 10/2017 | Mascaro | G06Q 40/123 |
| 2017/0315791 A1* | 11/2017 | Mascaro | G06F 8/60 |

OTHER PUBLICATIONS

ACM Digital Library Boosted Decision Tree Regression Adjustment for Variance Reduction in Online Controlled Experiments Alexey Poyarkov, Alexey Drutsa, Andrey Khalyavin, Gleb Gusev, Pavel Serdyukov KDD '16 Proceedings of the 22nd ACM SIGKDD International Conference on Knowledge Discovery Data Mining pp. 235-244.*

ScienceDirect Elsevier Business Horizons vol. 58, Issue 4, Jul.-Aug. 2015, pp. 431-440 The Internet of Things (IoT): Applications, investments, and challenges for enterprises in Lee, Kyoochun Lee.*

ScienceDirect Socio-Economic Planning Sciences vol. 37, Issue 4, Dec. 2003, pp. 289-316 The use of multi-criteria decision-making methods in the integrated assessment of climate change: implications for IA practitioners Michelle L Bell, Benjamin F Hobbs, Hugh Ellis.*

ScienceDirect.*

Hoeting et al., "Bayesian Model Averaging," Technical Report 335, Department of Statistics, University of Washington, May 28, 1998, 40 pages.

Rokach et al., "Top-Down Induction of Decision Trees Classifiers—A Survey," IEEE Transactions on Systems, Man, and Cybernetics—Part C: Applications and Reviews, vol. 35, No. 4, Nov. 2005, pp. 476-487.

Agrawal et al., "Thompson Sampling for Contextual Bandits with Linear Payoffs," Proceedings of the 30$^{th}$ International Conference on Machine Learning, Atlanta, Georgia, USA, JMLR: W&CP vol. 28, 2013, 9 pages.

Irsoy et al., "Budding Trees," 22$^{nd}$ International Conference on Pattern Recognition, 2014, pp. 3582-3587.

* cited by examiner

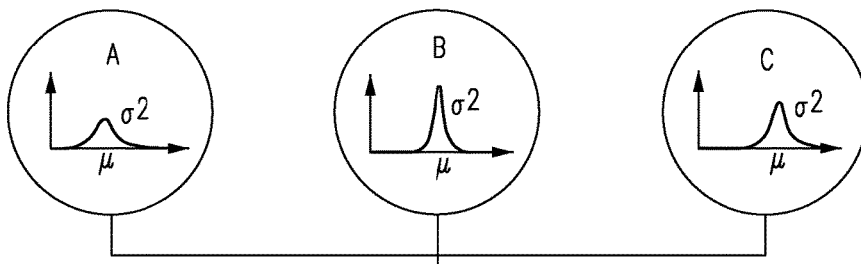

Compute the effective performance of the input estimates blended via Thompson Sampling.

Based on these estimates, compute the probability that the true performance of each experience is better than the other alternatives ($f_i$ is the pdf and $F_i$ is the cdf for the $i^{th}$ experience estimate).

$$p_I^L = p(\bigcap_{j \neq I} \mu_I > \mu_j) = \int f_I(x) \prod_{j \neq I} F_j(x)\, dx$$

e.g.
P(A > B & A > C) = 0.1
P(B > A & B > C) = 0.3
P(C > A & C > B) = 0.6

$\mu$ = sample mean       $\sigma^2$ = sample variance / number of samples

For the segment, define the allocation probability (the probability of assigning a particular experience to a user in this segment) to be equal to the previously computed probability of that experience being the best. That is, if the probability that C is the best experience is 0.6, then we will allocate 60% of the traffic in this segment to experience C. Given this allocation strategy, compute the effective performance of the entire segment as a weighted combination of each experience.

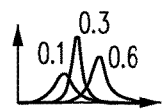   $\mu_{effective} = 0.1\,\mu_A + 0.3\,\mu_B + 0.6\,\mu_C$   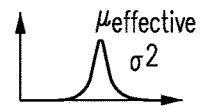

Assignment Prob
P(A) = 0.1
P(B) = 0.3
P(C) = 0.6

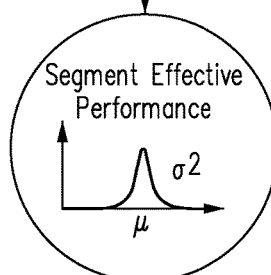

FIG. 13

METHOD AND SYSTEM FOR ADJUSTING ANALYTICS MODEL CHARACTERISTICS TO REDUCE UNCERTAINTY IN DETERMINING USERS' PREFERENCES FOR USER EXPERIENCE OPTIONS, TO SUPPORT PROVIDING PERSONALIZED USER EXPERIENCES TO USERS WITH A SOFTWARE SYSTEM

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the particular needs of a given user.

For instance, traditional tax return preparation systems often present a fixed, e.g., predetermined and pre-packaged, structure or sequence of questions to all users as part of the traditional tax return preparation interview process. This is largely due to the fact that the traditional tax return preparation system analytics use a sequence of interview questions, and/or other user experiences, that are static features and that are typically hard-coded elements of the traditional tax return preparation system and do not lend themselves to effective or efficient modification. As a result, the user experience, and any analysis associated with the interview process and user experience, is a largely inflexible component of a given version of the traditional tax return preparation system. Consequently, the interview processes and/or the user experience of traditional tax return preparation systems can only be modified through a redeployment of the tax return preparation system itself. Therefore, there is little or no opportunity for any analytics associated with the interview process, and/or user experience, to evolve to meet a changing situation or the particular needs of a given taxpayer, even as more information about that taxpayer, and their particular circumstances, is obtained.

As an example, when using traditional tax return preparation systems, the sequence of questions and the other user experience elements presented to a user are pre-determined and are based on a generic user model that is, in fact and by design, not accurately representative of any "real world" user. Consequently, irrelevant, and often confusing, interview questions are virtually always presented to any given real world user. It is therefore not surprising that many users, if not all users, of these traditional tax return preparation systems experience, at best, an impersonal, unnecessarily long, confusing, and complicated, interview process and user experience. Clearly, this is not the type of impression that results in happy, loyal, repeat customers.

Although, traditional tax return preparation systems may provide users with an impersonal interview process, resolving such a deficiency is not an easy task. For example, even if a service provider wanted to customize a traditional tax return preparation system flow or interview process for particular users, figuring out what the user wants to see or expects to see from the service provider can be as arduous a task as actually customizing the traditional tax return preparation system. Simply asking users would be an insufficient solution because many users themselves do not want to waste the time to answer questionnaires. Even more challenging to resolve is the dilemma that many of the users themselves likely do not know what their preferences are, until an option is presented to them. Thus, even if service providers of traditional tax return system wanted to customize their system to particular users' situations, such a task is quite daunting.

What is needed is a method and system for adjusting analytics model characteristics to reduce uncertainty in determining users' preferences for user experience options, to support providing personalized user experiences to users, at least partially based on the users' likely preferences, according to various embodiments.

SUMMARY

Embodiments of the present disclosure address some of the shortcomings associated with traditional tax return preparation systems and other software systems by adjusting analytics model characteristics to reduce uncertainty (improve accuracy) in determining users' preferences for user experience options, to support providing personalized user experiences to users, at least partially based on the users' likely preferences for user experience options, according to various embodiments. The disclosed software system uses one or more of a number of techniques for adjusting analytics model characteristics to compensate for overfitting and to improve the accuracy of the analytics model in determining users' preferences for user experience options, according to one embodiment. Overfitting is generally when a model (e.g., an analytics and/or statistical model) describes (or operates based on) noisy data rather than an underlying relationship between the data that is used to train the model. A model that has been overfit will generally have poor predictive performance. One way of adjusting analytics model characteristics for overfitting is to control the noise in the data that is used to define the analytics model. The software system uses one or more of a variety of techniques to control the noise, prevent/reduce overfitting, and/or adjust the analytics model characteristics. The techniques include, but are not limited to, using local stop probabilities to determine the number of levels/segments of a decision tree in the analytics model; establishing minimum numbers of users for defining segments of users for the decision tree nodes; and/or aggregating one or more defined nodes/segments of users to reduce signal variance/uncertainty by performing a type of decision tree pruning operation, according to one embodiment.

Because selective evaluation of past performance provides insights into future behavior, the disclosed methods and systems define an analytics model based on the apparent preferences for user experience options of prior users of a software system, according to one embodiment. The disclosed methods and systems determine relationships between characteristics of current users and characteristics of prior users of the software system, according to one embodiment. The disclosed methods and system determine likely users' preferences for user experience options of current users, based on the characteristics of the current users and based on the personal preferences for user experience options of the prior users, according to one embodiment. Thus, the embodiments of the present disclosure predict the likely preferences for user experience options of current users based on the evaluated/determined preferences of prior users of a software system.

Some techniques for defining an analytics model include defining a decision tree for the analytics model by determining stop probabilities, according to one embodiment. A stop probability is the likelihood that the performance of splitting a parent segment of users (e.g., parent node) into (potentially multiple levels of) child segments of users (e.g., child nodes) is better than the performance of the parent segment of users, according to one embodiment. Using stop probabilities based on multiple potential levels of child segments of users is one possible technique for determining current users' preferences; however, this technique relies primarily on varying the values of stop probabilities to adjust for noise in data samples and for error in predicting user preferences. Although in principle an analytics model can make more refined predictions by increasing the number of levels and/or segments in a decision tree, in practice decision trees that are too finely segmented may perform poorly when applied to new data. The predictions generated by the disclosed models rely on existing data that is inherently noisy—potentially leading to inaccurate predictions about user preferences. By selectively reducing and/or controlling the decision tree resolution and/or extent of segmentation, the disclosed system generates decision trees/analytics models that generate superior results to other models, at least because the decision trees/analytics models are less sensitive to or affected by data noise, according to one embodiment. While using stop probabilities is one technique for defining the nodes, depth, and other characteristics of the decision tree, the other techniques described herein enable the software system to adjust for overfitting and to adjust the aggressiveness of the analytics model through the dynamic adjustment of the resolution (e.g., number of levels/segments) of the decision tree in the analytics model, to improve determination of current users' preferences for user experience options and/or to operate the analytics model around pre-determined noise/accuracy characteristics/limits, according to one embodiment.

The software system uses the user experience analytics model to concurrently, dynamically, and adaptively validate and test the effects of user experience options among groups of current users, as a new technique for A/B testing user experience options. The software system groups prior and current users into segments of users, based on the user characteristics (e.g., age, income, home ownership, time data, etc.) that are common to the users of a segment. The user experience analytics model determines likely preferences for current users based on the preferences of prior users, and the software system applies at least two different user experience options to the current users of a segment to validate some users' preference for one of the user experience options and to test other users' preference for the other of the user experience options. By dynamically adapting the frequency with which the two different user experience options are delivered to current users of a particular segment, the software system dynamically adapts and improves the accuracy with which the software system delivers user experience options that are actually or likely to be preferred by the current users of the software system, according to one embodiment. The software system analyzes user responses to the user experience options to update the user experience analytics model and to dynamically adapt the personalization of the user experience options, at least partially based on feedback from users, according to one embodiment. In one embodiment, the software system is a tax return preparation system.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to prefer. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

By adapting analytics model characteristics to improve accuracy in determining users' preferences for user experience options, to support providing personalized user experiences to users, at least partially based on the users' likely preferences, implementation of embodiments of the present disclosure allows for significant improvement to the fields of user experience, electronic tax return preparation, data analytics, data modeling, data collection, and data processing, according to one embodiment. As one illustrative example, by adapting analytics model characteristics to improve accuracy in determining users' preferences for user experience options, to support providing personalized user experiences to users, at least partially based on the users' likely preferences, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by adapting analytics model characteristics to improve accuracy in determining users' preferences for user experience options, to support providing personalized user experiences to users, at least partially based on the users' likely preferences, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, based on their user characteristics, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

BRIEF DESCRIPTION OF THE DRAWINGS

FIG. 13 is a flow diagram of an example of a process for computing the effective performance of input estimates blended by Thompson Sampling, according to one embodiment.

Figure 1A:
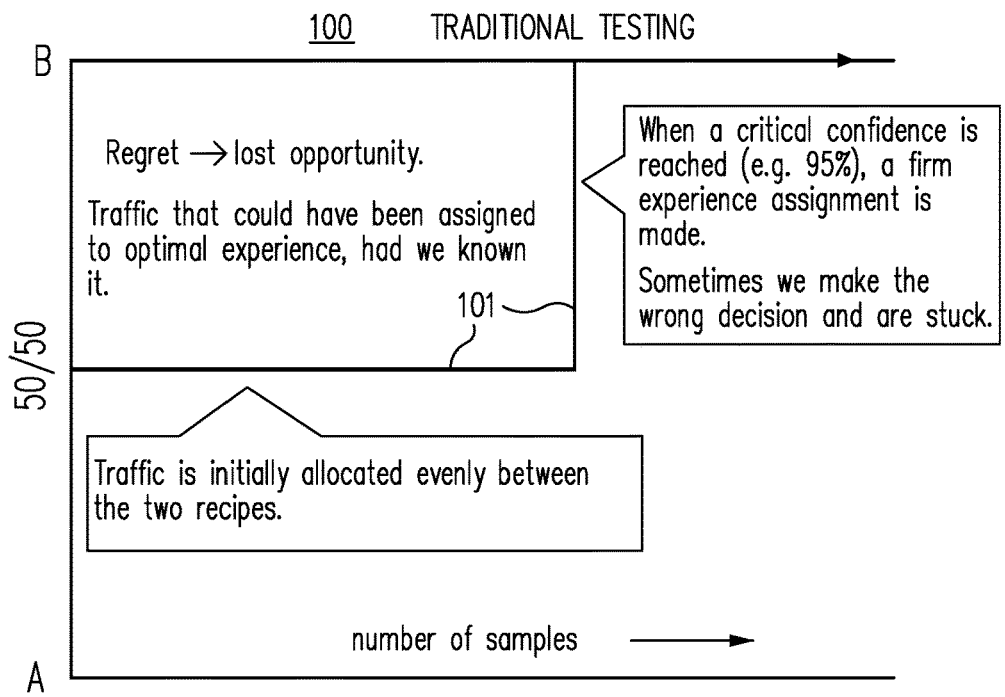
FIGS. 1A and 1B are graph diagrams of A/B testing techniques, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM section and the PROCESS and HARDWARE ARCHITECTURE section herein describe systems and processes suitable for adaptively providing personalized user experiences in a software system, such as a tax return preparation system, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "decision tree" denotes a hierarchical tree structure, with a root node, parent nodes, and children nodes. The parent nodes are connected to children nodes through edges, and edge logic between parent nodes and children nodes performs a gating function between parent nodes and children nodes to permit or block the flow of a path from a parent node to a child node. As used herein, a node is associated with a node action that a model or process performs on a data sample or on a set of data samples.

As used herein, the term "segment" denotes a portion, section, or subset of a set of users (i.e., a user set). A segment can include an entire set of users or a portion of a set of users. As used herein a segment or sub-segment denotes a portion, section, or subset of users who have one or more user characteristics (as defined below) in common.

As used herein, the term "distribution frequency rate" denotes decimal numbers, fractions, and/or percentages that represent an average quantity of traffic within a segment of users to which one or more user experience options are provided, with the software system. In alternative language, the term distribution frequency rate denotes decimal numbers, fractions, and/or percentages that represent an average quantity of traffic for a segment of users by which one or more user experience options are provided to a segment of users within a software system. For example, within a single segment of users, a first user experience option A is provided to users with a first distribution frequency rate, a second user experience option B is provided to users with a second distribution frequency rate, and the second distribution frequency rate is 1 minus the first distribution frequency rate, according to one embodiment and as disclosed further below.

As used herein, the term "uncertainty" denotes a quantification of noise, and noise represents the generation or receipt of results that are not representative of the probabilistic outcome for a data set. In other words, noise represents the difference in average or likely results between a small data sample set and a very large data sample set.

Process and Hardware Architecture

Disclosed herein is a production environment for adapting analytics model characteristics to improve accuracy in determining users' preferences for user experience options, to support providing personalized user experiences to users, at least partially based on the users' likely preferences for user experience options, according to various embodiments. The disclosed software system uses one or more of a number of techniques for adjusting analytics model characteristics to compensate for overfitting and to improve the accuracy of the analytics model in determining users' preferences for user experience options, according to one embodiment. Overfitting is generally when a model (e.g., an analytics and/or statistical model) describes (or operates based on) noisy data rather than an underlying relationship between the data that is used to train the model. A model that has been overfit will generally have poor predictive performance. One way of adjusting analytics model characteristics for overfitting is to control the noise in the data that is used to define the analytics model. The software system uses one or more of a variety of techniques to control the noise, prevent/reduce overfitting, and/or adjust the analytics model characteristics. The techniques include, but are not limited to, using local stop probabilities to determine the number of levels/segments of a decision tree in the analytics model; establishing minimum numbers of users for defining segments of users for the decision tree nodes; and/or aggregating one or more defined nodes/segments of users to reduce signal variance/uncertainty by performing a type of decision tree pruning operation, according to one embodiment.

Because selective evaluation of past performance provides insights into future behavior, the disclosed methods and systems define an analytics model based on the apparent preferences for user experience options of prior users of a software system, according to one embodiment. The disclosed methods and systems determine relationships between characteristics of current users and characteristics of prior users of the software system, according to one embodiment. The disclosed methods and system determine likely users' preferences for user experience options of current users, based on the characteristics of the current users and based on the personal preferences for user experience options of the prior users, according to one embodiment. Thus, the embodiments of the present disclosure predict the likely preferences for user experience options of current users based on the evaluated/determined preferences of prior users of a software system.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to respond well to. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

Figure 1B:
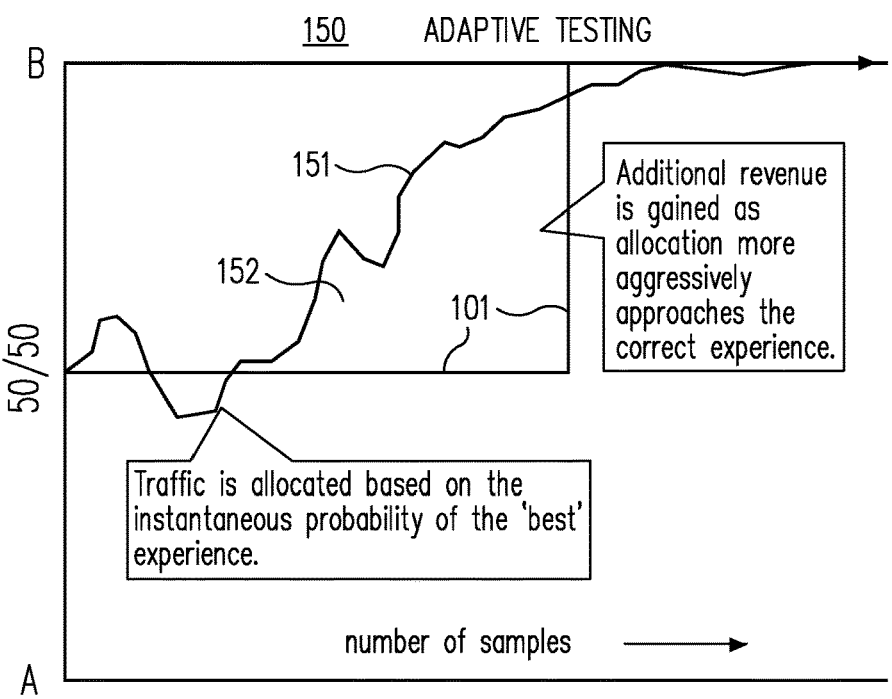

FIGS. 1A and 1B are graphical representations of some of the advantages of adaptive A/B testing over traditional A/B testing, according to one embodiment. FIG. 1A is an example of a graph 100 that illustrates delivery of a condition A to 50% of a user set and delivery of a condition B to 50% of a user set for a number of samples (x-axis), using traditional A/B testing techniques. Conditions A and B are equally distributed to the user sets until a critical confidence level is reached, e.g., 95%. After the critical confidence level is reached, traditional testing techniques switch to delivering the more successful of the conditions to 100% of the user set. In the graph 100, the test switches at a number of samples, represented by graph line 101, that were tested until a confidence level (e.g., 95%) was reached. Everything above and to the left of the graph line 101 represents lost opportunity to provide condition B to the user set rather than condition A (which has ultimately been deemed inferior).

FIG. 1B shows a graph 150 that illustrates an adaptive delivery of condition A (e.g., a first user experience option) and condition B (e.g., a second user experience option) to the user set while determining which condition is superior to the other, according to one embodiment. The graph 150 includes a graph line 151 that represents a percentage of condition B that is allocated to the user set, according to one embodiment. The area 152 that is under the graph line 151 illustrates that more users of the user set receive condition B sooner by using adaptive A/B testing instead of the traditional A/B testing illustrated by FIG. 1A, according to one embodiment. Importantly, providing condition B sooner equates to providing more users with user experiences that are in accordance with the users' preferences and that are more likely to assist users in completing or accomplishing a particular activity (e.g., providing personal information, paying for a service, signing up as a service provider customer, staying logged in to a user session, complete filing a tax return, etc.), according to one embodiment. Thus, implementation of adaptive testing by providing personalized user experiences in a software system, as disclosed herein, translates to increases in quantities of satisfied customers and improved revenue for the service provider of the software system, according to one embodiment. The systems, methods, algorithms, and techniques of FIGS. 3-14 disclose various embodiments that leverage the advantages of adaptive testing as described with respect to FIGS. 1A and 1B, according to one embodiment.

Figure 2:
FIG. 2 is a diagram of examples of personalized user experiences, in accordance with one embodiment.

FIG. 2 illustrates an example embodiment of a personalized user experience 200 and a personalized user experience 210, which can be delivered to a user via software system, at least partially based on characteristics of the user, to increase user satisfaction with the user experience and to cause the user to perform one or more actions (e.g., answer a question, provide personal information, file a tax return, remain logged in to the software system, etc.), according to one embodiment. The personalized user experiences 200 and 210 display a number of optional versions of a software system that can be purchased or used to prepare a tax return for the user, according to one embodiment. The personalized user experience 200 includes a number of icon-inclusive buttons 201, representing a user experience option A, according to one embodiment. The personalized user experience 210 includes a text banner 211, representing a user experience option B, according to one embodiment. The analytics model used by the software system provides the personalized user experience 200 or the personalized user experience 210 to users, based on the user characteristics of the users, based on the segment associated with the users, and/or based on the likelihood that the users will have a preference for the user experience option A or the user experience option B, according to one embodiment. The personalized user experiences 200 and 210, the icon-inclusive buttons 201, and the text banner 211, are merely a few examples of hundreds or thousands of possible variations of personalized user experiences and of user experience options that can be identified, generated, and/or delivered to users based on the users' preferences for user experience options, to encourage the users to perform one or more actions towards becoming a paying customer of a tax return preparation system or of another service provided by service provider, according to one embodiment.

Figure 3:
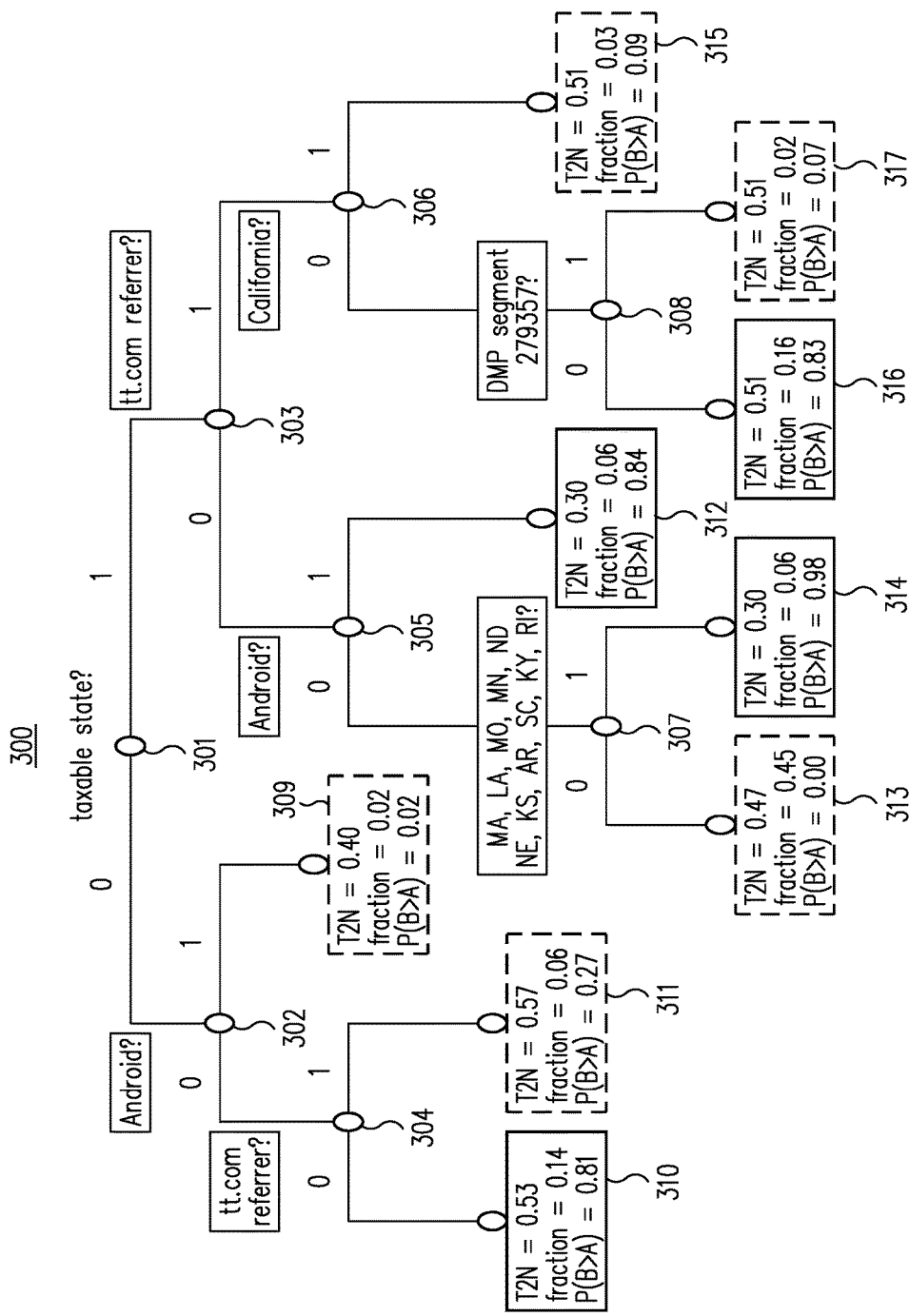
FIG. 3 is a diagram of an example of a decision tree used by a software system to determine which user experience option to provide a user based on the user's characteristics, in accordance with one embodiment.

FIG. 3 illustrates an example of a decision tree 300 that can be used by the software system to determine whether to provide user experience option A or user experience option B (e.g., shown in FIG. 2) to a user based on the user's characteristics, according to one embodiment. The decision tree 300 includes a number of decision nodes, a number of decision node logic (e.g., edge logic), and a number of leaf nodes that represent providing one of user experience option A or user experience option B to a user whose characteristics satisfy the criteria to reach a particular leaf node, according to one embodiment. The decision tree 300 includes decision nodes 301, 302, 303, 304, 305, 306, 307, and 308, according to one embodiment. The decision node 301 determines whether the user's characteristics identify the user as being in a taxable state, according to one embodiment. If the user is not in a taxable state, the user progresses towards the decision node 302; otherwise, the user progresses towards the decision node 303, according to one embodiment. The decision node 302 determines whether the user's characteristics identify the user as being an android operating system user, according to one embodiment. If the user is an android user, the user is associated with the leaf node 309, according to one embodiment. Because the decision tree 300 has been defined with a user set (e.g., with data samples) where (for leaf node 309) the probability of user experience option B being more preferable than user experience option A is low (i.e., P(B>A)=0.02), the users whose user characteristics satisfy the criteria for leaf node 309 are provided user experience option A, according to one embodiment. In one embodiment, each of the leaf nodes identified with dashed-lines have low probabilities of user experience option B being more preferable than user experience option A. Therefore, each user that satisfies the criteria of the leaf nodes identified with dashed-lines (e.g., leaf nodes 309, 311, 313, 315, and 317) receives user experience option A, according to one embodiment. Similarly, each user that satisfies the criteria of the leaf nodes identified with solid-lines (e.g., leaf nodes 310, 312, 314, and 316) receives user experience option B, according to one embodiment.

The other decision nodes route users to the various leaf nodes 309-317, based on additional decision node logic, according to one embodiment. For example, the decision nodes 303 and 304 evaluate user characteristics based on whether the user was directed toward a tax return preparation system from a particular service provider website, according to one embodiment. The decision node 305 function similar to decision node 302 by evaluating the user to determine if the user is using a computing device that operates using an android operating system, according to one embodiment. The decision nodes 306 and 307 evaluate user characteristics based on one or more geographic regions of residence or geographic regions in which income was earned, according to one embodiment. The decision node 308 evaluates user characteristics based on whether a user's computing device has stored a particular web-based cookie, e.g., whether the user characteristics include association with a particular data management platform segment, according to one embodiment.

The decision tree 300 is used to determine whether to provide a user experience option A or a user experience option B to the user, according to one embodiment. The decision tree 300 includes specific examples of decision logic, that the decision logic, the number of levels, the number of leaf nodes, and the experiences provided to users for satisfying the criteria of a leaf node are but illustrative examples of some of the characteristics that can be defined in a decision tree used by a software system to provide personalized user experiences to users of, for example, a tax return preparation system, according to one embodiment.

Figure 4:
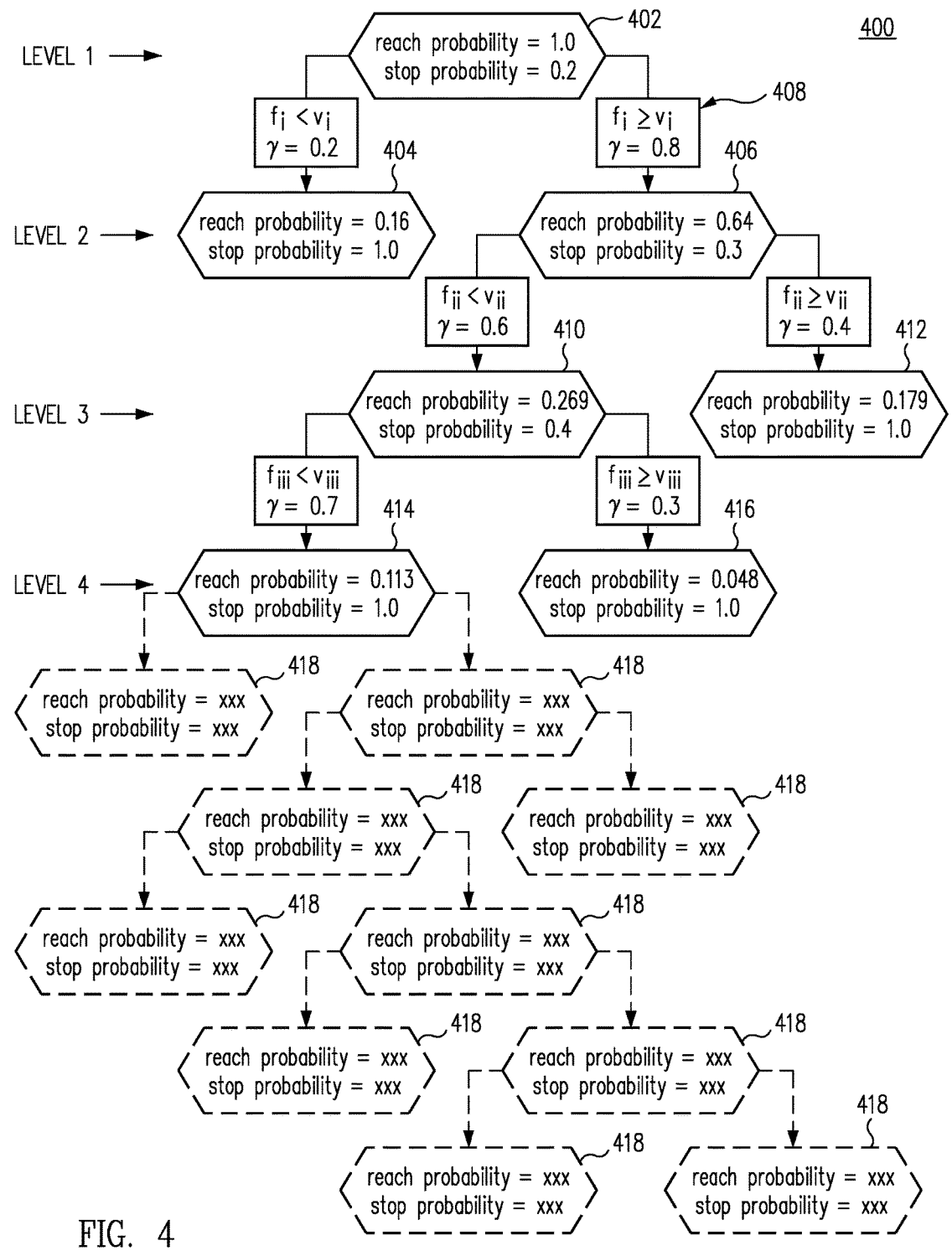
FIG. 4 is a diagram of an example of a decision tree to facilitate providing personalized user experiences in a software system, in accordance with one embodiment.

FIG. 4 illustrates an example of a decision tree 400 that is defined based on stop probabilities and that uses users' characteristics to select which user experience options to deliver to users, to facilitate providing personalized user experiences in a software system. The decision tree 400 includes nodes 402, 404, 406, 410, 412, 414, and 416 (collectively, nodes 402-416) connected together through edges and edge logic. The edge logic defines the rules and parameters for traversing from a parent node to a child node in the decision tree 400, according to one embodiment.

While defining the decision tree 400, an analytics model training algorithm compares the performance of a parent node with the performance of potential children nodes that could be split from the parent node based on additional user characteristics, according to one embodiment. The nodes are defined by the existence or quantity of a user characteristic within the data samples by which the decision tree 400 is defined, and the performance is based on the user experience options received by and the actions taken by the users associated with a node, according to one embodiment. Each node is associated with a segment of users who all have user characteristics that satisfy the edge logic leading to a particular node. Each node that is defined from a user set of data samples will therefore have a segment of users having a specific number of users (represented by the data samples). If splitting a parent node into multiple child nodes provides improved performance for the decision tree 400, then the analytics model training algorithm causes the parent node to be split, according to one embodiment.

In one embodiment, the performance is at least partially based on identifying a correlation between a segment of users, receipt of user experience options by the users of the segment, and actions taken by the users (e.g., business metrics such as becoming a paying customer). For example, the segment of users associated with the node 410 may have users who received user experience option A at 70%, received user experience option B at 22%, and received user experience option C at 19% (total percentage can be greater than 100% because some users of the data samples can receive more than one user experience option). From this, the analytics model training algorithm can identify user experience option A as probabilistically most effective for application to new users having similar characteristics as the segment of users associated with node 410, according to one embodiment. The analytics model training algorithm can also identify user experience option B as probabilistically second-most effective for application to new users having similar characteristics as the segment of users associated with node 410, according to one embodiment. In one embodiment, the analytics model training algorithm associates one or more of the highest effective user experience options (e.g., A, B, and/or C) with the node (e.g., 410) for application to new users to which the decision tree 400 is applied. In one embodiment, the analytics model training algorithm identifies a likelihood of effectiveness of each user experience option associated with a node. In one embodiment, the likelihood of effectiveness of each user experience option associated with a node is a distribution frequency rate at which user experiences options are provided to new users who have user characteristics that satisfy the criteria of a node.

Each of the nodes 402-416 includes node properties, such as a reach probability, a stop probability, a user experience option, and a user segment.

The reach probability is the probability that a particular person's user characteristics will satisfy the criteria of a particular node in the decision tree, according to one embodiment. Because all users are evaluated by the node 402, the reach probability of the node 402 is 1, indicating that there is a 100% chance that a user's characteristics will satisfy the criteria of the node 402. Node 404 has a reach probability of 0.16 and node 406 has a reach probability of 0.64. Accordingly, of all the user traffic that is applied to the decision tree 400, node 404 will receive 16% of the user traffic and node 406 will receive 64% of the user traffic, on average, if the future traffic is similar to the data samples used to define the decision tree 400, according to one embodiment.

In one embodiment, each node represents a segment of users who have received one of two user experience options. The percentage with which the users of a segment have received one of two user experience options are percentages that are used as distribution frequency rate for future user traffic applied to the decision tree, according to one embodiment. The distribution frequency rate changes based on the evolving performance of user experience options among the users of each segment, according to one embodiment. So, while some users of a segment might initially receive a first user experience option at a distribution frequency rate of 0.7, with time users of the segment may receive the first user experience option at a distribution frequency rate than evolves toward 0.0 or that evolves towards 1.0, based on the responses/actions of the users of the segment that receive the first user experience. As a result, the software system validates the performance of one user experience option among the users of a segment, while testing the performance of another user experience option among the other users of the segment, to eventually determine which of two or more user experience options is most preferred by the users of a segment, according to one embodiment.

The stop probability is the probability that the performance of a particular node (e.g., node 414) without children nodes will be better than the performance of potentially multiple levels of children nodes (e.g., nodes 418) split from the particular node (e.g., node 414), according to one embodiment. In other words, the stop probability is the probability that the performance of a leaf node is greater than the performance of recursively creating sets of children nodes from a leaf node to convert the leaf node to a parent node, grandparent node, great-grandparent node, etc., according to one embodiment. If a stop probability is 1, then the probability of stopping the further evaluation of the data sample is 100%. If a stop probability is less than 1, then the stop probability represents the likelihood that the decision tree will stop continuing to split a segment of users into smaller segments, according to one embodiment.

In one embodiment, edge logic includes an edge frequency ($\gamma$) for which a single user characteristic ($f_i$) satisfies a threshold ($v_i$). The edge logic provides rules and the average frequency by which data samples traverse parent nodes to children nodes. The edge logic 408 indicates that the probability of the user characteristic ($f_i$) being greater than or equal to the threshold ($v_i$) is 0.8, and that the probability of the user characteristic ($f_i$) being less than the threshold ($v_i$) is 0.2, according to one embodiment. The reach probability of a child node is the product of the edge frequency ($\gamma$) multiplied with the stop probability subtracted from one. For example, the reach probability of node 406 is 0.64 which is equal to (1−stop probability of node 402)* ($\gamma$=0.8). In one embodiment, the thresholds for descendent nodes are different than all ancestor nodes because each descendent node already satisfies or inherits all of the characteristics of the descendent node's ancestor nodes.

Each of the nodes 402-416 belong to a level that is defined by 1 plus the number of connections between the node of interest and the root node. Because the root node is the top node in the decision tree 400, the root node for the decision tree 400 is the node 402. Accordingly, node 402 belongs to level 1, nodes 404 and 406 belong to level 2, nodes 410 and 412 belong to level 3, and nodes 414 and 416 belong to level 4 of the decision tree 400, according to one embodiment.

When applying the decision tree to new users, after the decision tree has been defined, each node is associated with one or more user experience options to be delivered to users whose user characteristics satisfy the edge logic/criteria for reaching a particular node. In one embodiment, the user experience options for a node are related to the level of the node in the decision tree 400. In one embodiment, all levels of one decision tree provide binary options for whether or not to apply a single user experience option to a user's personalized user experience. In one embodiment, each level of the decision tree is associated with a different user experience option, and each level of the decision tree provides binary options for whether or not to apply the user experience option associated with that level to a user's personalized user experience. In one embodiment, user experience options are allocated to nodes within the decision tree, based on the quantity of users associated with a node that have received particular user experience options.

In one embodiment, a user experience option is defined as omitting a user experience element (e.g., a button, a text box, a question, a webpage, etc.) from a user's personalized user experience. In one embodiment, a user experience option is defined as adding a user experience element or applying an analytics model, a sequence, or other user experience tool to a user's personalized user experience. In one embodiment, a user experience analytics model includes a different decision tree for each user experience option, so that each of the nodes in the decision tree represent a binary decision to apply or to not apply a user experience option to the user's personalized user experience. In one embodiment, the user experience analytics model includes a different decision tree for each user characteristic, and each of the nodes in the decision tree represent the application of two of a number of user experience options to users' personalized user experiences (e.g., in accordance with distribution frequency rates for the user experience options and for the particular segment of users). In one embodiment, the user experience analytics model includes a decision tree having edge logic that evaluates different user characteristics and each node of the decision tree represent the application of one or more of a number of user experience options (rather than a Boolean application of a single user experience option).

The analytics model training module can use model characteristics adjustments or model characteristics adjustment techniques to initiate and/or update an analytics model (e.g., a user experience analytics model 819, shown in FIG.

8), to control the effects of data noise, to reduce/prevent overfitting, and to adjust characteristics of the analytics model or of a decision tree used by the analytics model, according to one embodiment. Characteristics of an analytics model and/or decision tree include, but are not limited to, stop probabilities, reach probabilities, local stop probabilities, number of levels, number of leaf nodes, number of users in each or all segments of users associated with the leaf nodes, number of decision nodes, edge logic (extending from a parent node to a child node), and variance/uncertainty in the predicted preferences of users, according to one embodiment. The model characteristics adjustment techniques include, but are not limited to: applying local stop probabilities to determine whether or not to split a node/segment of users in a decision tree; applying a minimum number of users threshold to the size of segments of users to determine whether or not to split a node/segment of users; and aggregating segments of users associated with nodes to control/reduce variance/uncertainty in determining users' preferences for user experience options, according to one embodiment. Each of these techniques is described below with reference to FIGS. 5, 6, and 7, respectively, according to one embodiment.

Figure 5:
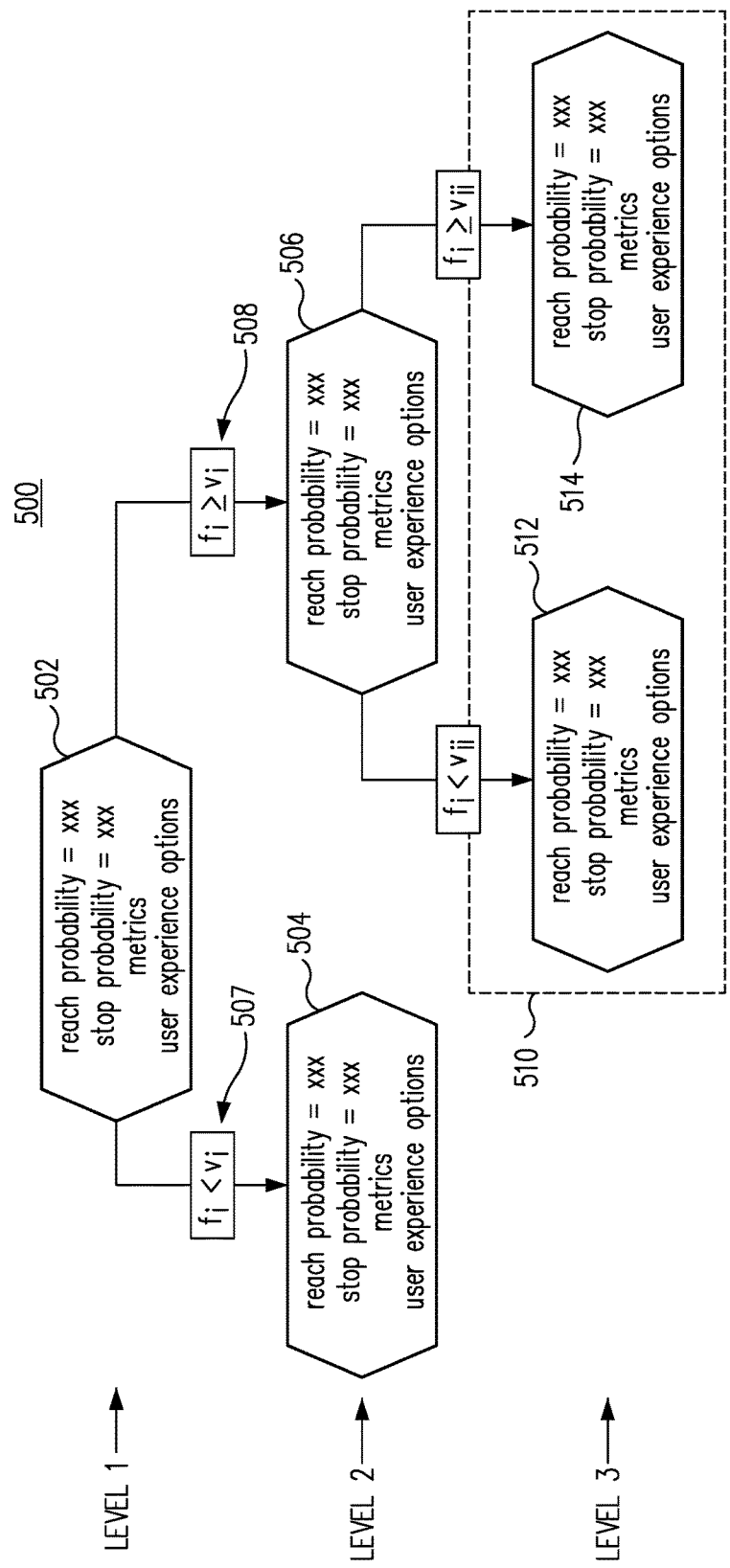
FIG. 5 is a diagram of an example of a decision tree that uses a local stop probability to define the decision tree, in accordance with one embodiment.

FIG. 5 illustrates an example of a decision tree 500 that incorporates a local stop probability to define the number of nodes/levels of the decision tree, to reduce the variance/uncertainty in preference predictions performed by the decision tree 500, according to one embodiment. Defining the decision tree 500 at least partially based on the local stop probability is one of a number of techniques that can be used to reduce variance/uncertainty in predicting preferences for user experience options of users of a software system, according to one embodiment. The decision tree 500 includes nodes 502, 504, and 506, according to one embodiment. Data samples are split from the node 502 to the nodes 504 and 506 based on the edge logic 507 and 508, respectively, according to one embodiment. Each of the nodes 502, 504, and 506 include a reach probability, a stop probability, one or more metrics performed by the users associated with the node, and one or more user experience options received by the users associated with the node, according to one embodiment.

An analytics model training algorithm within the software system determines whether to split, for example, node 506 by comparing the performance of the node 506 with the performance of potential children nodes 510, according to one embodiment. The performance of the nodes is associated with the likelihood that users within the segment performed a particular action and received a particular user experience option, according to one embodiment. The local stop probability is the probability that the performance of the decision tree by not splitting node 506 is greater than the performance of the decision tree by splitting the node 506 into the potential children nodes 510 (inclusive of nodes 512 and 514), according to one embodiment.

Splitting nodes based on the local stop probability can provide less variance/uncertainty in user preference predictions than splitting nodes based on a stop probability that takes into account the performance of multiple levels of children nodes split from a parent node. By contrast the local stop probability is calculated based just on the performance of the nodes 506, 512, and 514, according to one embodiment.

Figure 6:
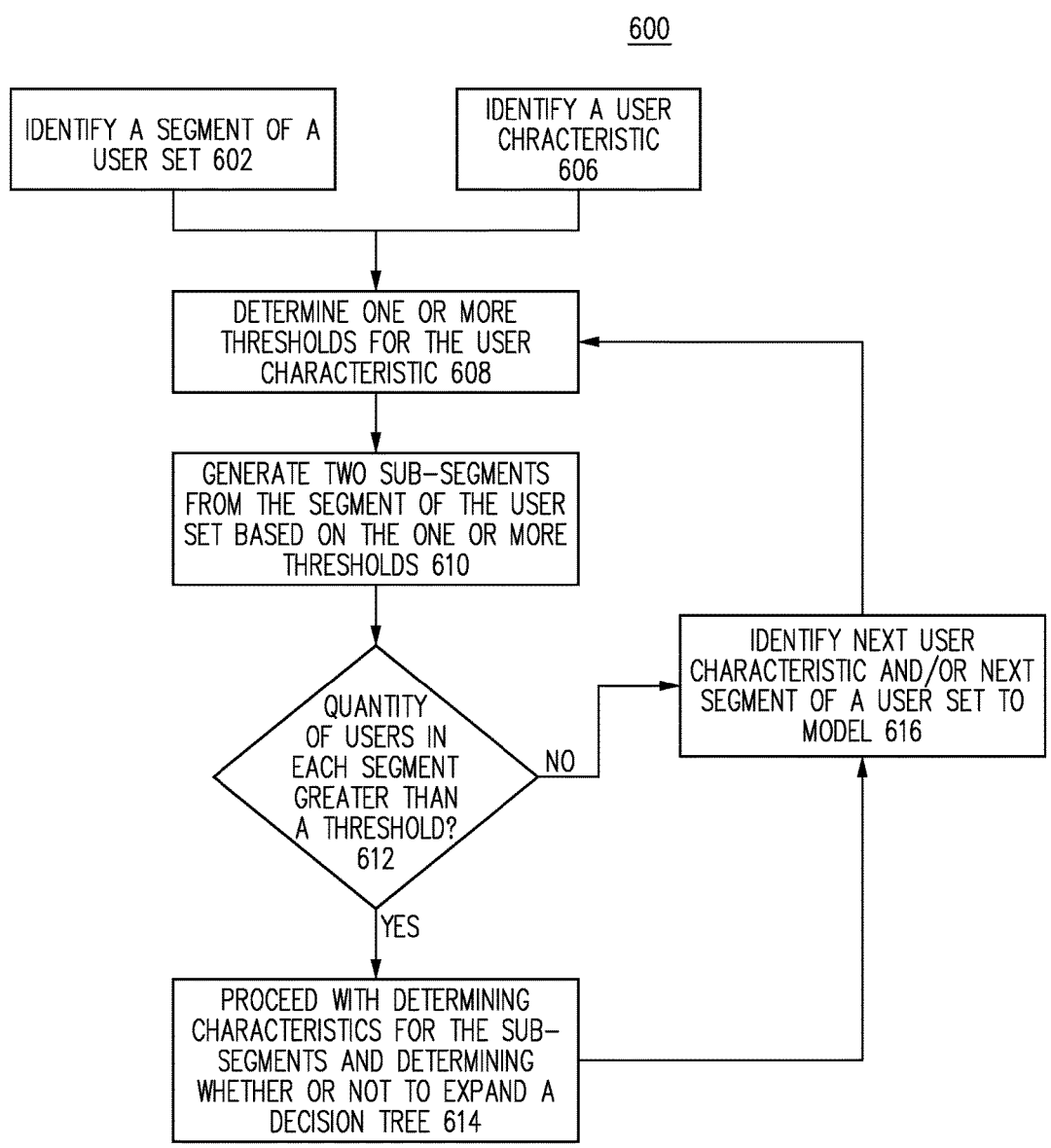
FIG. 6 is a flow diagram of an example of a process for initializing and/or updating a decision tree with a minimum threshold number of users in a segment, in accordance with one embodiment.

FIG. 6 illustrates an example of a process 600 that is employed or executed by a software system for initializing and/or updating a decision tree with a minimum threshold number of users in a segment, according to one embodiment. Applying a minimum threshold to the number of users in a segment as a constraint to creating new segments is one of a number of techniques that can be applied to the algorithm of an analytics model in a software system, to improve/control the variance/uncertainty in predicting preferences for user experience options of users of the software system, according to one embodiment.

At operation 602 the process identifies a segment of a user set, according to one embodiment. The segment may be the entirety of the user set, may include recent users of the user set, may include users who have interacted with a software system over a predetermined period of time (e.g., during a previous year), or may be any other subset of the user set, according to one embodiment. Operation 602 proceeds to operation 608, according to one embodiment.

At operation 606, the process identifies a user characteristic, according to one embodiment. As described in more detail below, user characteristics can include personal identification information, income information, tax-related information, clickstream information, geographic location of the user, an IP address or other computing or other user computing device identification information, family information about the user, and the like, according to various embodiments. The process performs operation 606 before, after, or concurrently with operation 602, according to one embodiment. Operation 606 proceeds to operation 608, according to one embodiment.

At operation 608, the process determines one or more thresholds for the user characteristic, according to one embodiment. By determining the one or more thresholds, the process is able to define additional segments of users, to determine if the identified user experience option more effectively causes one segment of users to perform a particular action better than another segment of users, according to one embodiment. In other words, a threshold value such as 35 years of age, for a user characteristic of age, can be used to bifurcate a segment of users of all ages into to a sub-segment of users who are less than 35 years old and a sub-segment of users who are at least 35 years old, according to one embodiment. Operation 608 proceeds to operation 610, according to one embodiment.

At operation 610, the process generates two sub-segments from the segment of the user set, based on the one or more thresholds, according to one embodiment. Operation 610 proceeds to operation 612, according to one embodiment.

At operation 612, the process determines whether a quantity of users in each segment is greater than a threshold, according to one embodiment. If the quantity of users in each segment is greater than the threshold, the process proceeds to operation 614, according to one embodiment. If the quantity of users in each segment is not greater than the threshold, the process proceeds to operation 616, according to one embodiment.

At operation 614, the process proceeds with determining characteristics for the sub-segments and determining whether or not to expand a decision tree, according to one embodiment. The characteristics for the sub-segments includes, but is not limited to, stop probabilities, local stop probabilities, reach probabilities, business metrics of the users of the sub-segments, user experience options received by the users of the sub-segments, estimated variance/uncertainty of the performance of a sub-segment, and determined performance or effective performance of the sub-segments, according to one embodiment. Operation 614 proceeds to operation 616, according to one embodiment.

At operation 616, the process identifies a next user characteristic and/or a next segment of a user set to model, according to one embodiment. Operation 616 proceeds to operation 608, according to one embodiment.

Figure 7:
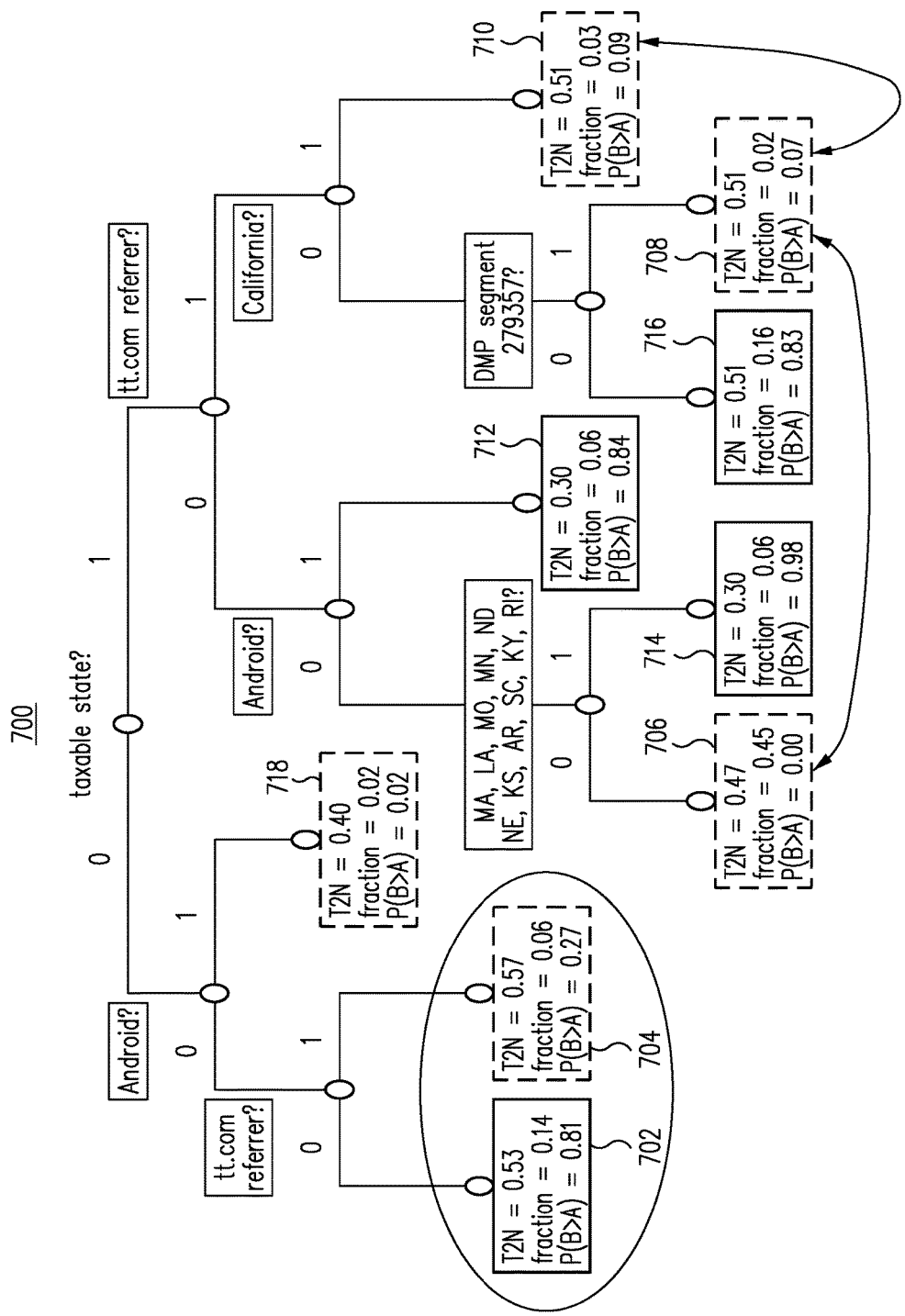
FIG. 7 is a diagram of an example a decision tree that shows examples of aggregating nodes and segments of users to control and/or reduce variance/uncertainty in predicting user preferences for user experience options, in accordance with one embodiment.

FIG. 7 illustrates a decision tree 700 that illustrates examples of aggregating nodes and segments of users to control and/or reduce variance/uncertainty in predicting user preferences for user experience options, according to one embodiment. In one embodiment, a software system, an analytics model, or an analytics module that includes the analytics model is configured to evaluate the characteristics and/or performance of the decision tree and is configured to selectively aggregate segments of users associated with some of the nodes of the decision tree to effectively adjust the characteristics and/or performance of the decision tree, according to one embodiment.

Similar to the decision tree 300 (shown in FIG. 3), the solid-lined nodes (e.g., 702, 712, 714, and 716) represent users who have similar user characteristics and are associated with the delivery of the same or similar user experience characteristics to users, according to one embodiment. The dash-lined nodes (e.g., 704, 706, 708, 710, and 718) represent users who have similar user characteristics and are associated with the delivery of the same or similar user experience characteristics to users, according to one embodiment. For example, the solid-lined nodes are configured to deliver user experiences A and B to users whose user characteristics satisfy the edge logic criteria of the solid-lined nodes, and the dash-lined nodes are configured to deliver user experiences C and D to users whose user characteristics satisfy the edge logic criteria of the dash-lined nodes, according to one embodiment.

In one embodiment, the software system is configured to aggregate segments of users of adjacent nodes, e.g., nodes 702 and 704, which are adjacent based on edge logic. For example, if the software system determines that the number of users in the segment of users of node 702 and/or of node 704 is less than a threshold of users, the software system can be configured to aggregate the segments of users associated with nodes 702 and 704, by ignoring one or more segment splitting criteria/edge logic (e.g., splitting based on "tt.com referrer"). In one embodiment, aggregating the segments of users of nodes 702 and 704 includes providing the user experience options of node 702 to the segments of users of nodes 702 and 704. In one embodiment, aggregating the segments of users of nodes 702 and 704 includes providing the user experience options of node 704 to the segments of users of nodes 702 and 704. In one embodiment, aggregating the segments of user of nodes 702 and 704 includes determining the most frequently received user experience options for the segments of users used to define node 702 and node 704, and selectively distributing these user experience options to the aggregated segments of users of nodes 702 and 704 to determine which user experience options are more preferred by the aggregated segments of users of nodes 702 and 704.

One effect of aggregating segments of users of adjacent nodes, e.g., nodes 702 and 704, is that the determined preferences of the aggregated segments of users will be based on more data samples. Because determined preferences that are based on more data samples generally result in less variance/uncertainty and noise than those that are based on fewer data samples, the aggregation of segments of users of adjacent nodes is one technique that can be used to improve the prediction/identification of user preferences for user experience options, according to one embodiment.

In one embodiment, the software system is configured to aggregate segments of users of nodes where the users have received or will receive similar user experience options, e.g., nodes 706, 708, and 710. For example, if the software system determines that the number of users in the segment of users of nodes 706, 708, and/or 710 is less than a threshold of users, the software system can be configured to aggregate the segments of users associated with nodes 706, 708, and/or 710, by determining and delivering user preferences based on the aggregation of the segments of users associated with nodes 706, 708, and 710. In one embodiment, aggregating the segments of users of nodes 706, 708, and 710 includes providing the user experience options of node 706 to the segments of users of nodes 706, 708, and 710. In one embodiment, aggregating the segments of users of nodes 706, 708, and 710 includes providing the user experience options of node 708 to the segments of users of nodes 706, 708, and 710. In one embodiment, aggregating the segments of user of nodes 706, 708, and 710 includes determining the most frequently received user experience options for the segments of users used to define nodes 706, 708, and 710, and selectively distributing these user experience options to the aggregated segments of users of nodes 706, 708, and 710 to determine which user experience options are more preferred by the aggregated segments of users of nodes 706, 708, and 710.

One effect of aggregating segments of users of similar nodes, e.g., nodes 706, 708, and 710, is that the determined preferences of the aggregated segments of users will be based on more data samples. Because determined preferences that are based on more data samples generally result in less variance/uncertainty and noise than those that are based on fewer data samples, the aggregation of segments of users of similar nodes is one technique that can be used to improve the prediction/identification of user preferences for user experience options, according to one embodiment.

Figure 8:
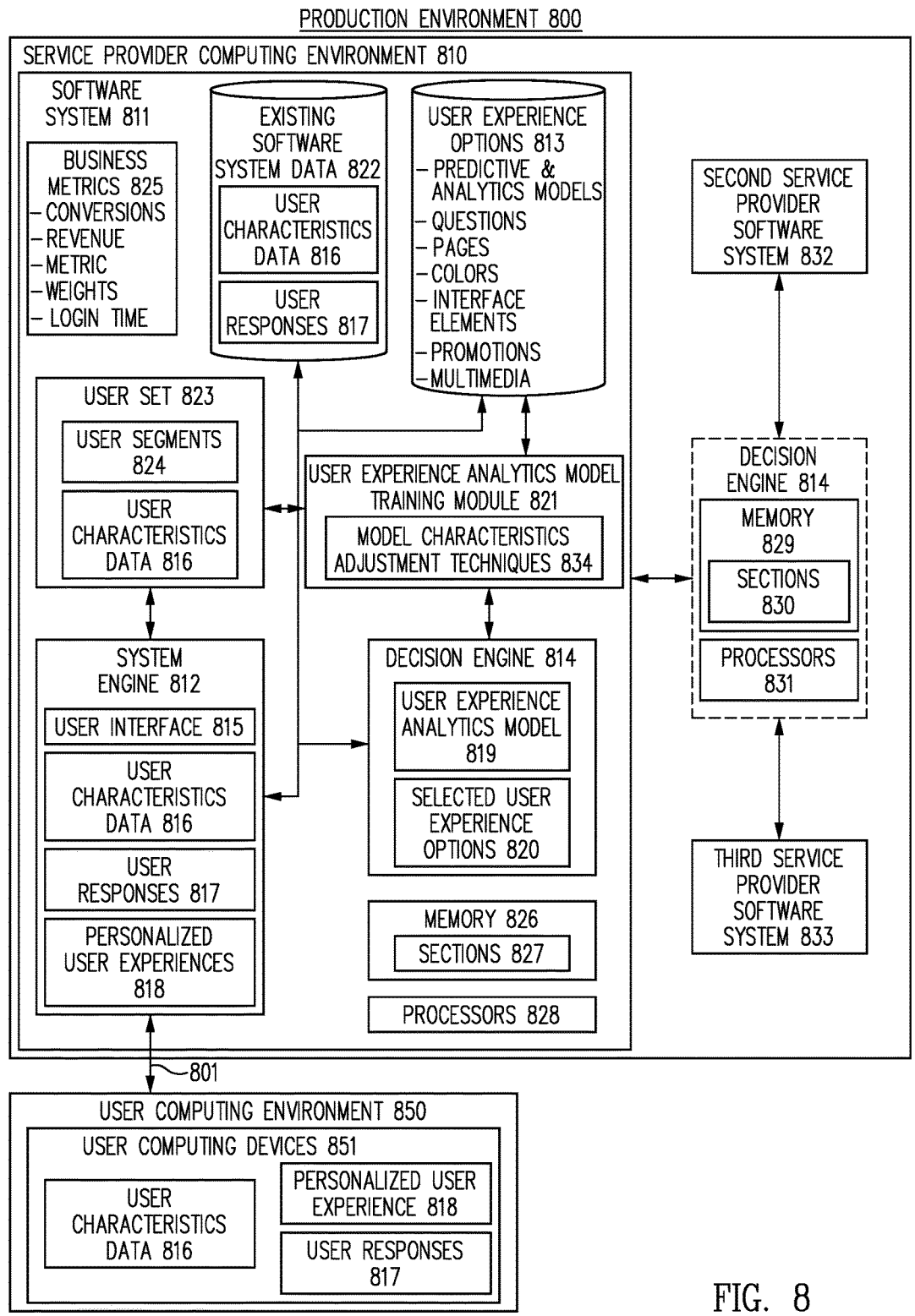
FIG. 8 is a block diagram of an example architecture for adaptively providing personalized user experiences, in accordance with one embodiment.

FIG. 8 illustrates an example embodiment of a production environment 800 for adaptively providing personalized user experiences in a software system, e.g., a tax return preparation system. The production environment 800 is configured to apply one or more techniques to reduce the effects of data noise, to reduce/prevent overfitting, and/or to adjust analytics model characteristics of an analytics model that determines user preferences for user experience options, according to one embodiment. The production environment 800 includes a service provider computing environment 810 and a user computing environment 850 to deliver personalized user experiences to users of a software system, to cause the users to perform one or more particular actions (e.g., answer a sequence of questions, continue use of the software system, file a tax return, etc.), according to one embodiment. The computing environments 810 and 850 are communicatively coupled to each other with a communication channel 801, according to one embodiment.

The service provider computing environment 810 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 810 represents a traditional data center computing environment, a virtual asset computing environment (e.g., a cloud computing environment), or a hybrid between a traditional data center computing environment and a virtual asset computing environment, to host one or more software systems, according to one embodiment. The one or more software systems can include, but are not limited to tax return preparation systems, other financial management systems, and applications that support the tax return preparation systems and/or the other financial management systems, according to one embodiment. The service provider computing environment 810 includes a software system 811 that adaptively provides personalized user experiences by providing users with user experience options in accordance with distribution frequency rates, at least partially based on user characteristics for the users, according to one embodiment. By adaptively providing personalized user experiences, the software system 811 improves user satisfaction, increases service provider revenue, facilitates user interactions with user interfaces, determines user preferences for user experience options, while concurrently, automatically, and seamlessly increasing user distribution of well-performing user experience options from the software system 811, according to one embodiment. The software system 811 includes various components, databases, engines, modules, and data to support adaptively providing personalized user experiences to users of the software system 811, according to one embodiment. The software system 811 includes a system engine 812, user experience options 813, and a decision engine 814, according to one embodiment.

The system engine 812 is configured to communicate information between users and the software system 811, according to one embodiment. The system engine 812 executes/hosts a user interface 815, according to one embodiment. The system engine 812 executes/hosts the user interface 815 to receive user characteristics data 816 and to receive user responses 817 from users, in response to personalized user experiences 818 provided to the users by the software system 811, according to one embodiment. The user interface 815 includes one or more user experience elements and graphical user interface tools, such as, but not limited to, buttons, slides, dialog boxes, text boxes, dropdown menus, banners, tabs, directory trees, links, audio content, video content, and/or other multimedia content for communicating information to the user and for receiving the information from users, according to one embodiment.

The system engine 812 and/or the software system 811 communicates with the user through the user computing environment 850, according to one embodiment. The user computing environment 850 includes user computing devices 851 that are representative of computing devices or computing systems used by users to access, view, operate, and/or otherwise interact with the software system 811, according to one embodiment. The term "users" and "user computing devices" are used interchangeably to represent the users of the software system 811, according to one embodiment. Through the user computing devices 851, users provide the user characteristics data 816 and provide the user responses 817 to the software system 811, in response to receipt of the personalized user experiences 818, according to one embodiment.

The user characteristics data 816 represents user characteristics for users of the software system 811, according to one embodiment. The user characteristics data 816 can include information from existing software system data 822, such as one or more previous years' tax return data for a particular user and previous user interactions with the software system 811. The user characteristics data 816 is stored in a data store, a database, and/or a data structure, according to one embodiment. The user characteristics data 816 also includes information that the software system 811 gathers directly from one or more external sources such as, but not limited to, a payroll management company, state agencies, federal agencies, employers, military records, public records, private companies, and the like, according to one embodiment. Additional examples of the user characteristics (represented by the user characteristics data 816) include, but are not limited to, click stream data, data indicating user computing system characteristics (e.g., browser type, applications used, device type, operating system, etc.), data indicating time-related information (hour of day, day of week, etc.), data indicating geographical information (latitude, longitude, designated market area region, etc.), data indicating external and independent marketing segments, data identifying an external referrer of the user (e.g., paid search, ad click, targeted email, etc.), data indicating a number of visits made to a service provider website, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, duration of viewing content, duration of remaining logged into the software system 811, and any other information that is currently used, that can be used, or that may be used in the future, in a financial system, or in the preparation of a user's tax return, according to various embodiments.

The system engine 812 provides personalized user experiences 818, by populating and/or using one or more user experience options 813 in the personalized user experience 818, according to one embodiment. The user experience options 813 include predictive and analytics models that can be used to determine relevant topics to present to the user; questions to present to user; sequences of topics to present to user; sequences of questions to present to user; and the like, according to one embodiment. The user experience options 813 also include, but are not limited to, questions, webpages, sequences of pages, colors, interface elements, positioning of interface elements within webpages, promotions that can be offered to users, marketing content, audio files, video files, other multimedia, and the like, according to various embodiments.

Users of the software system 811 will have individual preferences, technical competency levels, levels of education, levels of comfort using digital technologies, and other distinctive or individual characteristics that increase the value of personalized user experiences of the software system 811 for the users. To improve the likelihood of satisfaction of the user with the user's experience with the software system 811, the system engine 812 selectively applies one or more of the user experience options 813 to the personalized user experiences 818 while facilitating interactions between the software system 811 and the users, according to one embodiment.

The software system 811 uses the decision engine 814 to identify which user experience options 813 to apply to the personalized user experiences 818, in order to facilitate or promote one or more particular user actions (e.g., such as completing a set of questions, continuing to use the software system 811, filing a tax return with the software system 811, etc.), according to one embodiment. The decision engine 814 is configured to receive the user characteristics data 816, receive the user experience options 813, and select one or more of the user experience options 813 for the system engine 812 to integrate into the personalized user experiences 818 for users of the software system 811, according to one embodiment.

The decision engine 814 applies the user characteristics data 816 and the user experience options 813 to a user experience analytics model 819, to determine which user experience options 813 to apply to users with particular user characteristics, according to one embodiment. The user experience analytics model 819 returns distribution frequency rates for user experience options 813, based on the user characteristics data 816, according to one embodiment. The distribution frequency rates define a frequency with which users having particular user characteristics receive particular user experience options, according to one embodiment.

The decision engine 814 uses the distribution frequency rates from the user experience analytics model 819 to generate a weighted pseudo-random number that represents the one or more user experience options that are to be provided to a user based on the user's user characteristics data, according to one embodiment. Examples of distribution frequency rates include 0.2 for a first user experience option, 0.5 for a second user experience option, and 0.3 for a combination of one or more other user experience options, according to one embodiment. In practice, 0.2, 0.5, and 0.3 distribution frequency rates means that for a particular user characteristic, 2 out of 10 users receive the first user experience option, 5 out of 10 users receive the second user experience option, and 3 out of 10 users receive the combination of one or more other user experience options, according to one embodiment. The decision engine 814 uses the distribution frequency rates and the weighted pseudo-random number to identify selected user experience options 820, for delivery to the user, according to one embodiment.

While the user experience options 813 are described as experience elements/features that are added to the personalized user experiences 818, the selected user experience options 820 can also include the omission of one or more user experience options 813. For example, the user experience analytics model 819 can be configured to generate distribution frequency rates of 0.8 and 0.2 for determining whether or not to display large icon buttons in the personalized user experiences 818, according to whether the age, income level, employment status, education level, or other user characteristic is above or below one or more thresholds that are set within the user experience analytics model 819, according to one embodiment. In other words, the output of the user experience analytics model 819 can be Boolean and can simply determine whether a user receives a user experience option or not, based on the user's user characteristics, according to one embodiment.

In one embodiment, the user experience analytics model 819 includes/incorporates one or more of the decision trees, algorithms, and/or techniques illustrated in FIGS. 3-7 and described above in connection with FIGS. 3-7, to determine user preferences for user experience options and to provide personalized user experiences, according to one embodiment.

The software system 811 uses, executes, and/or operates a user experience analytics model training module 821 to train (e.g., initialize and update) the user experience analytics model 819, according to one embodiment. The user experience analytics model training module 821 retrieves user characteristics data 816 from the existing software system data 822 and retrieves user experience options 813 for use in training the user experience analytics model 819, according to one embodiment. The user experience analytics model training module 821 initializes and/or updates the user experience analytics model 819 using techniques that include, but are not limited to, decision trees, regression, logistic regression, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment.

In one embodiment, the user experience analytics model training module 821 defines a user set 823 that is based on all or part of the users that have interacted with the software system 811 and/or for whom user characteristics data 816 has been gathered or received. The user experience analytics model training module 821 defines a number of user segments 824 around subsets of commonly held user characteristics. In other words, the user segments 824 are subsets of the user set 823, and each of the user segments 824 have one or more user characteristics in common, according to one embodiment.

The user experience analytics model training module 821 trains the user experience analytics model 819 by generating a decision tree, based on how particular user experience options 813 perform with particular user segments 824, according to one embodiment. The performance of the user experience options 813 with the user segments 824 is measured, at least in part, by the user responses 817 and/or the business metrics 825, according to one embodiment. The user experience analytics model training module 821 generates a decision tree as part of the analytics logic for the user experience analytics model 819, to facilitate generating distribution frequency rates. The processes 900, 1000, 1100, 1200, 1300, and 1400, of FIGS. 9, 10, 11, 12, 13, and 14 respectively, disclose particular embodiments that may be used by the user experience analytics model training module 821 for initializing and/or updating the user experience analytics model 819, according to one embodiment.

The user experience analytics model training module 821 includes model characteristics adjustment techniques 834, according to one embodiment. The model characteristics adjustment techniques 834 include variables and/or techniques that can be applied to the initiation and/or updating of the user experience analytics model 819, to adjust characteristics of the user experience analytics model 819, according to one embodiment. Characteristics of the user experience analytics model 819 include, but are not limited to, stop probabilities, reach probabilities, local stop probabilities, number of levels, number of leaf nodes, number of users in each or all segments of users associated with the leaf nodes, number of decision nodes, edge logic (extending from a parent node to a child node, and variance/uncertainty in the predicted preferences of users, according to one embodiment. The model characteristics adjustment techniques 834 include, but are not limited to: applying local stop probabilities to determine whether or not to split a node/segment of users in a decision tree; applying a minimum number of users threshold to the size of segments of users to determine whether or not to split a node/segment of users; and aggregating segments of users associated with nodes to control/improve variances in determining users' preferences for user experience options, according to one embodiment. The user experience analytics model training module 821 applies one or more model characteristics adjustment techniques 834 associated with decision tree 500 (shown in FIG. 5), process 600 (shown in FIG. 6), and decision tree 700 (shown in FIG. 7), according to one embodiment.

The software system 811 adapts to user responses 817 received from users, to update the user experience analytics model 819, and to dynamically and adaptively improve the personalized user experiences 818, according to one embodiment. The software system 811 is configured to store/update user characteristics data 816 and user responses 817, as the existing software system data 822, during the operation of the software system 811. The user responses 817 includes user responses to questions, user click-stream while interacting with the software system 811, dwelling time on one or more user interface pages, and other actions that the user may take in response to receipt of the personalized user experiences 818, according to one embodiment. After a predetermined period of time, such as, but not limited to, an hour, a day, semi-weekly, weekly, biweekly, and the like, the user experience analytics model training module 821 retrieves the user experience options 813, the user characteristics data 816, the user responses 817, and the business metrics 825 to determine the performance of the user experience options 813 and to update the user experience analytics model 819, based on the performance of the user experience options 813, according to one embodiment.

The business metrics 825 include, but are not limited to, the various metrics used by the software system 811 and/or the service provider of the software system 811 to evaluate the success, failures and/or the performance of the user experience options 813, according to one embodiment. The business metrics 825 include, but are not limited to, number of conversions of users from potential customers to paying customers, the percentage of conversions of potential customers to paying users, quantities of revenue, rates of revenue collected per user (e.g., average revenue collected per user), increases/decreases in revenue as compared to one or more previous years, months, weeks, days, and metric weights that are applied to conversions and revenues to establish a relative importance of conversions verses revenue generation. The business metrics 825 can also include records of other actions taken by users, such as, but not limited to, numbers of questions answered, duration of use of the software system 811, number of pages or user experience displays visited within a software system 811, use of customer support, and the like, according to one embodiment.

The software system 811 includes memory 826 that has one or more sections 827 allocated for the operation or support of the software system 811, according to one embodiment. For example, the memory 826 and/or the one or more sections 827 are allocated to the storing and/or processing of: user characteristics data 816, user responses 817, the user experience analytics model 819, the user experience analytics model training module 821, and the like, according to one embodiment. The software system 811 also includes one or more processors 828 configured to execute and/or support the operations of the software system 811, according to one embodiment.

In one embodiment, the decision engine 814 is integrated into the software system 811 to support operation of the software system 811. In one embodiment, the decision engine 814 is hosted in the service provider computing environment 810 and is allocated various computing resources, e.g., one or more processors 831 and memory 829 having sections 830, that are different than some of the computing resources of the software system 811. The decision engine 814 is hosted in the service provider computing environment 810 in order to provide support for the software system 811, in addition to providing support for a second service provider software system 832 and/or a third service provider software system 833, according to one embodiment. Although a second service provider software system 832 and a third service provider software system 833 are illustrated and described herein, the decision engine 814 can be configured to operationally support fewer or more software systems, according to various embodiments.

The user experience analytics model training module 821 initializes and/or updates the user experience analytics model 819 from a backend or off-line system, rather than as an integrated online process, according to one embodiment. For example, rather than sharing memory and processor resources with the software system 811, the user experience analytics model training module 821 is allocated dedicated memory and processor resources to facilitate secure and more timely processing of user characteristics of new and existing software system data, and of user experience options for training the user experience analytics model 819. In another embodiment, the user experience analytics model training module 821 is integrated into the software system 811, as illustrated, and shares one or more hardware resources with the decision engine 814, within the service provider computing environment 810, according to one embodiment.

Figure 9:
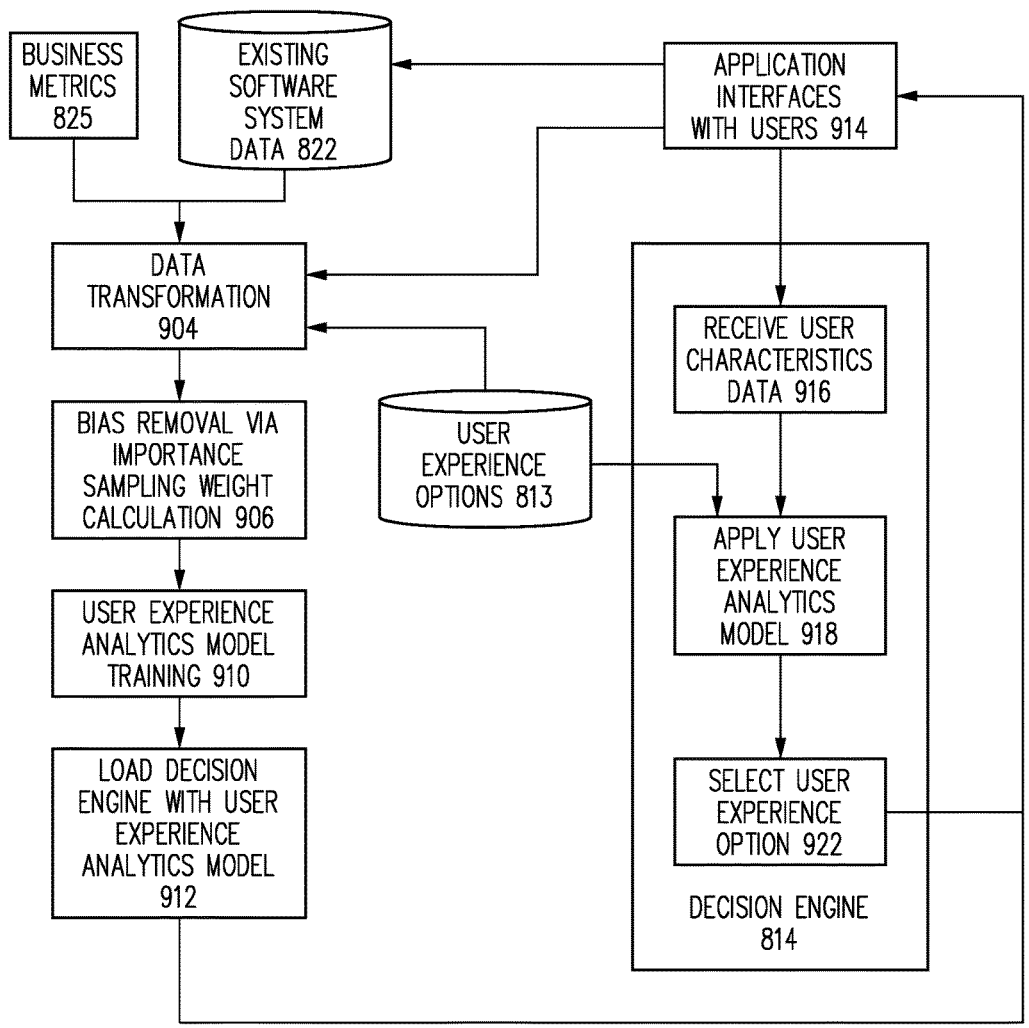
FIG. 9 is a flow diagram of an example of a process for training and updating a user experience analytics model, according to one embodiment.

FIG. 9 illustrates a process 900 for training (e.g., initializing and updating) the user experience analytics model 819, as described above, according to one embodiment.

At operation 904, the process performs data transformation, to prepare existing software system data 822 and data representing business metrics 825 for processing, according to one embodiment. The process performs data transformation on the existing software system data 822 (inclusive of user characteristics data and user responses), on user experience options 813, and on business metrics 825. Data transformation includes, but is not limited to, formatting, rearranging, organizing, ranking, and/or prioritizing the data to enable it to be uniformly processed or analyzed by one or more equations and/or algorithms, according to one embodiment. Operation 904 proceeds to operation 906, according to one embodiment At operation 906, the process performs bias removal via importance sampling weight calculation, according to one embodiment. The process performs bias removal on the business metrics, such as conversions and revenue, as well as on user responses for the existing software system data 822 to account for particular user characteristics that were targeted, that are different, or that otherwise bias the user responses and/or the business metrics, according to one embodiment. Operation 906 proceeds to operation 910, according to one embodiment At operation 910, the process performs user experience analytics model training, according to one embodiment. The process uses the same algorithm to initialize and to update the user experience analytics model, according to one embodiment. The process trains the user experience analytics model by using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment. In one embodiment, the process 900 performs user experience model training by creating, validating, and/or modifying a decision tree. The process 900 uses one or more of decision tree 300 (shown in FIG. 3), decision tree 400 (shown in FIG. 4), decision tree 500 (shown in FIG. 5), process 600 (shown in FIG. 6), and decision tree 700 (shown in FIG. 7) to train the user experience analytics model, according to one embodiment. Operation 910 proceeds to operation 912, according to one embodiment.

At operation 912, the process loads the decision engine with the user experience analytics model, according to one embodiment. Operation 912 proceeds to operation 914, according to one embodiment.

At operation 914, an application interfaces with users, according to one embodiment. The application interfaces with users by providing the users with questions to acquire user responses and/or to acquire user characteristics, according to one embodiment. The application interfaces with users by collecting clickstream data, IP address information, location of the user, operating system used by the user, user computing device identifiers, and other user characteristics data, according to one embodiment. The application and the decision engine save business metrics, user characteristics data, and/or user responses as existing software system data 822, according to one embodiment. The term "application" is used interchangeably with the term "software system", according to one embodiment. Operation 914 concurrently proceeds to operation 904 to update the user experience analytics model, and proceeds to operation 916 to apply the user experience analytics model to information received from the users, according to one embodiment.

At operation 916, the decision engine 814 receives user characteristics data, according to one embodiment. Operation 916 proceeds to operation 918, according to one embodiment.

At operation 918, the decision engine 814 applies the user experience analytics model to the user characteristics data and to user experience options 813, according to one embodiment. The decision engine 814 applies the user experience analytics model to the user characteristics data and to the user experience options 813 to determine the distribution frequency rates for which a particular user experience option is to be distributed to users having one or more of the user characteristics received during operation 916, according to one embodiment. Operation 918 proceeds to operation 922, according to one embodiment.

At operation 922, the decision engine 814 selects a user experience option, according to one embodiment. The decision engine 814 selects a user experience option based on the distribution frequency rates generated by the user experience analytics model in response to receipt of user characteristics data that describe a user. The decision engine 814 generates a pseudo-random number that is weighted according to the distribution frequency rates generated by the user experience analytics model, according to one embodiment. For example, if the user experience analytics model generates distribution frequency rates of 0.8 for filling a user experience display with a background color of red and 0.2 for filling a user experience display with a background color of blue, then the decision engine 814 generates a binary number which will indicate selecting a blue background color 8 out of 10 times and will indicate selecting a red background color 2 out of 10 times, on average, according to one embodiment. Because computing systems typically generate "random" numbers using algorithms and clocks, a "random" number generated by a computing system is referred to as a "pseudo-random" number.

Figure 10:
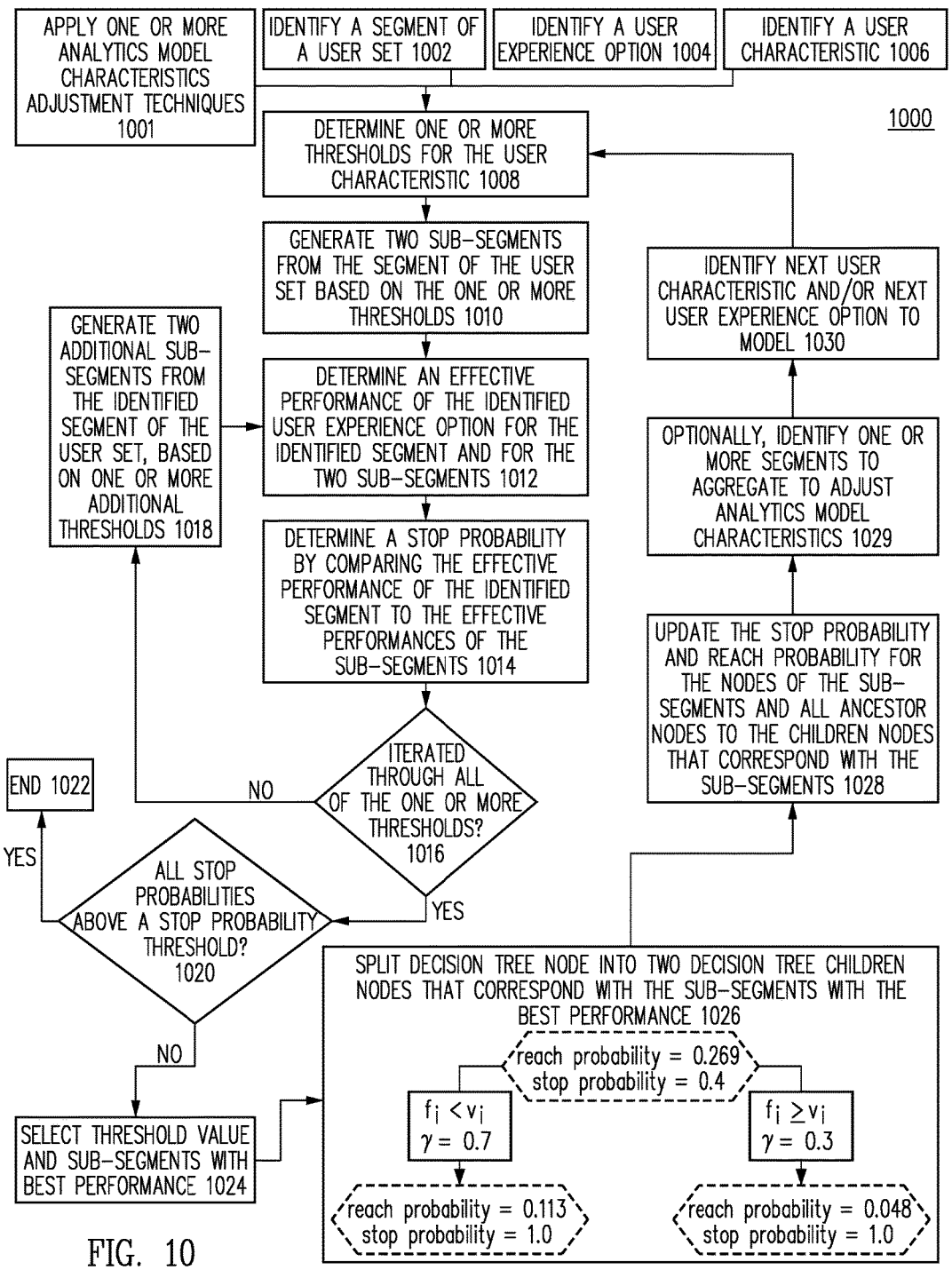
FIG. 10 is a flow diagram of an example of a process for defining a user experience analytics model, in accordance with one embodiment.

FIG. 10 illustrates an example of a process 1000 that is employed or executed by the software system 811 of the production environment 800, to periodically update the user experience analytics model 819, according to one embodiment. By periodically updating the user experience analytics model and/or by defining/initializing the user experience analytics model 819, a software system (e.g., a tax return preparation system or other finance management system) can reap the benefits of deploying user experience options that are immediately effective on users (with a probabilistic certainty) while concurrently and adaptively testing user responses to other stimuli, e.g., other user experience options, to improve user satisfaction with the personalized user experience provided by the software system 811, according to one embodiment.

At operation 1001, the process applies one or more analytics model characteristics adjustment techniques, according to one embodiment. The analytics model training module can use model characteristics adjustment techniques to adjust characteristics of the analytics model or of a decision tree used by the analytics model, according to one embodiment. Characteristics of an analytics model and/or decision tree include, but are not limited to, stop probabilities, reach probabilities, local stop probabilities, number of levels, number of leaf nodes, number of users in each or all segments of users associated with the leaf nodes, number of decision nodes, edge logic (extending from a parent node to a child node), and variance/uncertainty in the predicted preferences of users, according to one embodiment. The model characteristics adjustment techniques include, but are not limited to: applying local stop probabilities to determine whether or not to split a node/segment of users in a decision tree; applying a minimum number of users threshold to the size of segments of users to determine whether or not to split a node/segment of users; and aggregating segments of users associated with nodes to control/improve variances in determining users' preferences for user experience options, according to one embodiment.

At operation 1002, the process identifies a segment of a user set, according to one embodiment. The segment may be the entirety of the user set, may include recent users of the user set, may include users who have interacted with a software system over a predetermined period of time (e.g., 8 during a previous year), or may be any other subset of the user set, according to one embodiment. Operation 1002 proceeds to operation 1008, according to one embodiment.

At operation 1004, the process identifies a user experience option, according to one embodiment. The user experience option identified by the process is used by the process to define nodes, node properties, and edge logic for traversing from parent nodes to children nodes, according to one embodiment. In one embodiment, identifying a user experience option includes identifying a plurality of user experience options, according to one embodiment. In one embodiment, operation 1004 occurs prior to operation 1002, after operation 1002, or concurrently with operation 1002, according to one embodiment. Operation 1004 proceeds to operation 1008, according to one embodiment.

At operation 1006, the process identifies a user characteristic, according to one embodiment. As described above, user characteristics can include personal identification information, income information, tax-related information, clickstream information, geographic location of the user, an IP address or other computing or other user computing device identification information, family information about the user, and the like, according to various embodiments. The process performs operation 1006 before, in between, after, or concurrently with operation 1002 and/or operation 1004, according to one embodiment. Operation 1006 proceeds to operation 1008, according to one embodiment.

At operation 1008, the process determines one or more thresholds for the user characteristic, according to one embodiment. By determining the one or more thresholds, the process is able to define additional segments of users, to determine if the identified user experience option more effectively causes one segment of users to perform a particular action better than another segment of users, according to one embodiment. In other words, a threshold value such as 35 years of age, for a user characteristic of age, can be used to bifurcate a segment of users of all ages into to a sub-segment of users who are less than 35 years old and a sub-segment of users who are at least 35 years old, according to one embodiment. In one embodiment, the process applies an analytics model characteristics adjustment technique to prevent splitting an identified segment on a threshold if the resulting sub-segments would have fewer data samples than a minimum threshold of users for a segment, to control/improve the variance/uncertainty in determining user preferences for user experience options, according to one embodiment. Operation 1008 proceeds to operation 1010, according to one embodiment.

At operation 1010, the process generates two sub-segments from the segment of the user set, based on the one or more thresholds, according to one embodiment. The operation 1010 proceeds to operation 1012, according to one embodiment.

At operation 1012, the process determines an effective performance of the identified user experience option for the identified segment and for the two sub-segments, according to one embodiment. The effective performance of the user experience option for the identified segment and/or for the two sub-segments is a probabilistic distribution that users (who are defined by the segments and/or sub-segments) will perform one or more predetermined actions, according to one embodiment. Examples of the determined actions include, but are not limited to, answering questions, remaining logged into a user session of the software system, filing a tax return, progressing through a sequence of topics or a sequence of questions, clicking a button, interacting with a particular user experience object or element, paying for a service, submitting credit card information, providing an email address, providing a telephone number, and the like, according to various embodiments. In one embodiment, the process uses Thompson Sampling on user responses to user experience options, at least partially based on user characteristics data, to determine a sample mean and a sample variance for the performance of user experience options on a segment of users, according to one embodiment. In one embodiment, the process uses Thompson Sampling blending or other mathematical techniques for calculating an average of multiple Thompson Samples to determine an effective performance of a user experience option on a segment or sub-segment, according to one embodiment. Operation 1012 proceeds to operation 1014, according to one embodiment.

At operation 1014, the process determines a stop probability by comparing the effective performance of the identified segment to the effective performances of the two sub-segments of the identified segment, according to one embodiment. The stop probability is the probability that the performance of the identified segment is greater than the effective performance of the two sub-segments, according to one embodiment. In terms of nodes in a decision tree, the stop probability is the probability that the effective performance of a user experience option that is associated with a parent node is greater than an effective performance of user experience options that are associated with children nodes, according to one embodiment. A low stop probability indicates that the likelihood of gaining additional effective performance from the user experience analytics model will likely be gained from splitting an identified segment into two sub-segments, according to one embodiment. In one embodiment, the process alternatively determines a local stop probability instead of a general stop probability. The local stop probability is determined by limiting the comparisons effective performances to a parent node and the potential children nodes of the parent node, without regard to the effective performance of additional descendant nodes, according to one embodiment. Operation 1014 proceeds to operation 1016, according to one embodiment.

At operation 1016, the process determines if the process has iterated through all identified thresholds, according to one embodiment. For user characteristics having binary or Boolean outcomes such as yes or no, there may not be multiple thresholds to iterate through. However, if the user characteristics that are used to define part of the model have continuous values, e.g., users' ages, user income, and the like, then the process advantageously identifies and recurses through the multiple thresholds (e.g., through multiple age ranges or income ranges) to test the effective performance of a user experience option against variations of sub-segments, according to one embodiment. If the process completes iterating through all of the one or more thresholds, operation 1016 proceeds to operation 1020, according to one embodiment. If the process has not iterated through all of the one or more thresholds, operation 1016 proceeds to operation 1018, according to one embodiment.

At operation 1018, the process generates two additional sub-segments from the identified segment of the user set, based on one or more additional thresholds, according to one embodiment. Operation 1018 proceeds to operation 1012, according to one embodiment.

At operation 1020, the process determines if all stop probabilities are above a stop probability threshold, according to one embodiment. If all stop probabilities are above a stop probability threshold, e.g., 0.8, the operation 1020 proceeds to operation 1022 to end the process, according to one embodiment. If at least one of the stop probabilities is not above the stop probability threshold, operation 1020 proceeds to operation 1024.

At operation 1024, the process selects a threshold value and the sub-segments with the best performance, according to one embodiment. The effective performance of segments and sub-segments is a probabilistic distribution having a sample mean and a sample variance. In one embodiment, the best performance includes a combination of a threshold and a user experience option that results in the highest sample mean. In one embodiment, the best performance includes a combination of a threshold and a user experience option that produces the lowest sample variance. In one embodiment, the best performance includes a combination of a threshold and a user experience option that produces the highest sample mean and/or the lowest sample variance while having a sample mean that is greater than a minimum threshold and/or while having a sample variance that is below a maximum sample variance threshold. Operation 1024 proceeds to operation 1026, according to one embodiment.

At operation 1026, the process splits a decision tree node into two decision tree children nodes that correspond with the sub-segments with the best performance, according to one embodiment. When creating children nodes, the node properties (e.g., the reach probabilities, stop probabilities, user experience options, etc.) are defined for the children nodes and the node properties for the parent node of the split are also updated. Operation 1026 proceeds to operation 1028, according to one embodiment.

At operation 1028, the process updates the stop probability and the reach probability for the nodes of the sub-segments and all ancestor nodes to the children nodes that correspond with the sub-segments, according to one embodiment. For example, because the sum of the reach probabilities for the nodes of the decision tree is 1, the reach probabilities of ancestor nodes are updated to reflect the addition of the children node reach probabilities, according to one embodiment. Operation 1028 proceeds to operation 1030, according to one embodiment.

At operation 1029, the process, optionally, identifies one or more segments to aggregate to adjust analytics model characteristics, according to one embodiment. Increasing the effective quantity of data samples associated with a node can decrease the variance/noise associated with the user preference predictions made with the node. In one embodiment, the process aggregates adjacent nodes/segments of users after the decision tree has been defined to decrease the variance/uncertainty in determining user preferences. In one embodiment, the process aggregates nodes associated with segments of users who received similar user experience options, after the decision tree has been defined to decrease the variance/uncertainty in determining user preferences.

At operation 1030, the process identifies a next user characteristic and/or a next user experience option to model, according to one embodiment. Operation 1030 proceeds to operation 1008, according to one embodiment.

Figure 11:
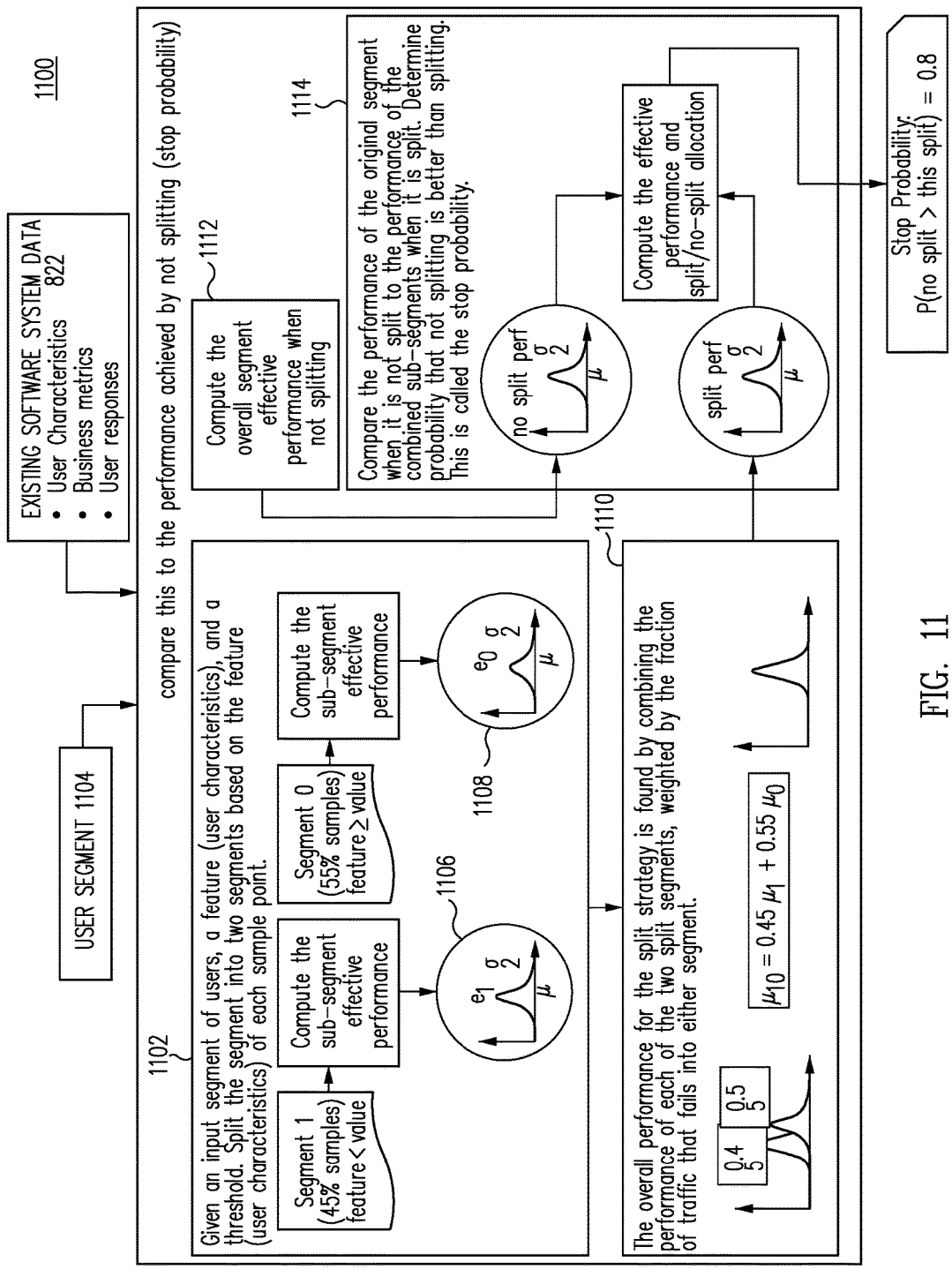
FIG. 11 is a flow diagram of an example of a process for determining a stop probability, in accordance with one embodiment.

FIG. 11 illustrates an example of a flow diagram for a process 1100 for determining a stop probability, according to one embodiment. The process 1100 is an example of one technique for determining a stop probability that can be performed during operation 1014 of FIG. 10 of the process 1000 for defining a user experience analytics model, according to one embodiment.

At block 1102, the process splits a user segment 1104 into two sub-segments, and determines the effective performance of each sub-segment based on existing software system data 822, according to one embodiment. The existing software system data includes, but is not limited to, user characteristics data, user responses, conversion rates of users to paying customers, revenue generated by the software system, and the like, according to one embodiment. The sub-segments are splits based on a value of the threshold and based on whether a user characteristic is less than the value or greater than or equal to the value of the threshold, according to one embodiment. The result of determining the effective performance of each sub-segment is a probabilistic distribution 1106 and a probabilistic distribution 1108 for the sub-segments, according to one embodiment. The probabilistic distributions 1106 and 1108 are not just an estimate of the performance of a user experience option on each sub-segment, instead, the probabilistic distributions 1106 and 1108 are estimations of the probability of the performance of a user experience option on the sub-segments. The effective performances result in probabilistic distributions because the effective performances are estimates of performance that include the uncertainty around how a user will respond to a user experience option integrated into the user's personalized user experience, according to one embodiment. The process proceeds from block 1102 to block 1110, according to one embodiment.

At block 1110, the process determines/computes the combined effective performance of the effective performance of the two sub-segments, according to one embodiment. The process determines the combined effective performance by using addition or other mathematical operations to combine the performance of each sub-segment, with each sub-segment effective performance weighted by the edge frequency (γ) (fraction of parent node traffic from FIG. 4), to remove bias, in one embodiment. The process proceeds from block 1110 to block 1114, according to one embodiment.

At block 1112, the process determines/computes the effective performance of the segment as though the sub-segments were not being split from the segment, according to one embodiment. In other words, the process computes the overall segment effective performance assuming the segment is not being split. The process proceeds from block 1112 to block 1114, according to one embodiment.

At block 1114, the process compares the effective performance of the segment, when it is not split, to the combined effective performance of the sub-sections, to determine the stop probability, according to one embodiment. The stop probability is the probability that the effective performance of the un-split segment is greater or better than the effective performance of splitting the segment, according to one embodiment.

Figure 12:
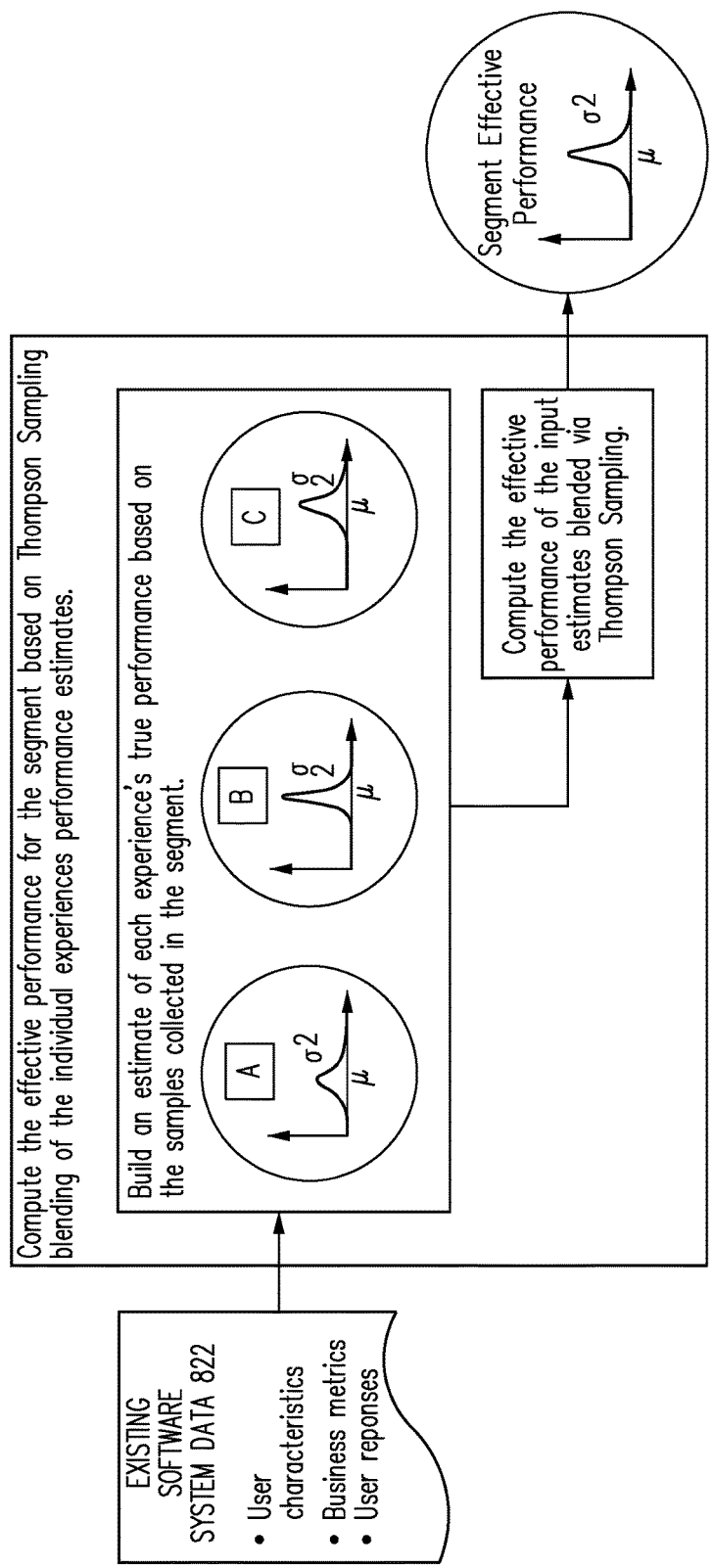
FIG. 12 is a flow diagram of an example of a process for computing the effective performance of a segment or sub-segment of users, in accordance with one embodiment.

FIG. 12 illustrates an example of a flow diagram of a process 1200 for computing the effective performance of a segment or sub-segment of users, according to one embodiment. The process 1200 is an example of one technique that can be used by operation 1012 (shown in FIG. 10) for the process 1000 for defining a user experience analytics model, according to one embodiment. The process 1200 is an example of one technique that can be used in blocks 1102 and/or 1112 (shown in FIG. 11) for the process 1100 for determining a stop probability, according to one embodiment.

The process 1200 uses existing software system data 822 to compute the effective performance for a segment based on Thompson Sampling blending of the performance of individual user experience options and/or based on each individual user's experience/feedback with the software system (e.g., in response to receiving the user experience option in the user's personalized user experience), according to one embodiment.

FIG. 13 illustrates an example flow diagram for a process 1300 for computing the effective performance of input estimates blended by Thompson Sampling, according to one embodiment. The process 1300 is an example of one technique that can be used in block 1114 (show in FIG. 11) of the process 1100 for determining a stop probability, according to one embodiment. The process 1300 is an example of one technique that can be used during the process 1000 for computing the effective performance of a segment or sub-segment, according to one embodiment.

The process 1300 uses the probability density function ("PDF") and the cumulative distribution function ("CDF") to determine the probability that the true performance of each user's experience or of each user experience option is better than alternative options, according to one embodiment. As illustrated in FIG. 13, the process 1300 computes the effective performance of an entire segment of users as a weighted combination of either each user's experience or of the distribution of a particular user experience option to the users of the segment of users, in one embodiment.

Figure 14A:
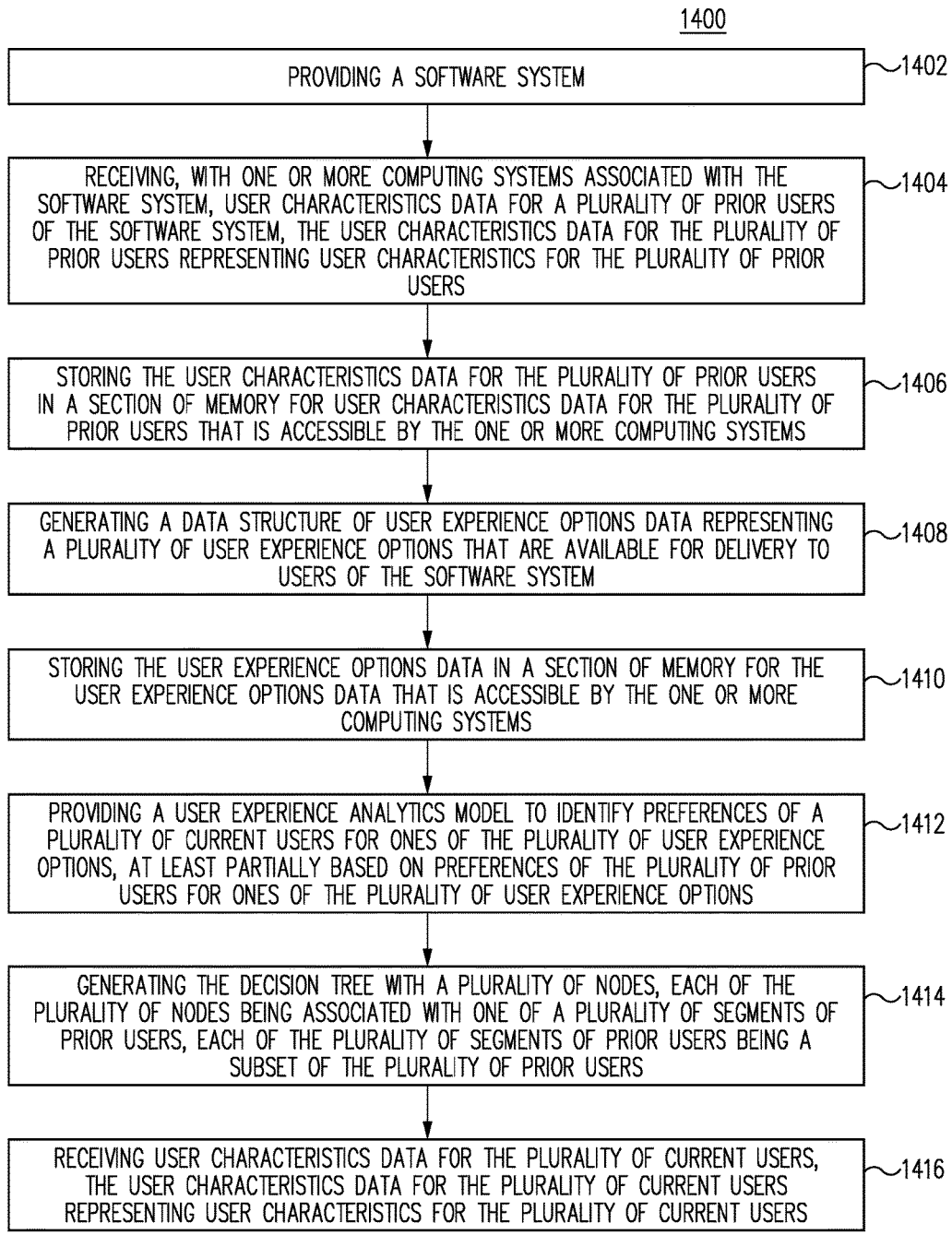
FIGS. 14A and 14B illustrate a flow diagram of an example of a process for adjusting analytics model characteristics to reduce uncertainty in determining users' preferences for user experience options, according to one embodiment.
Figure 14B:
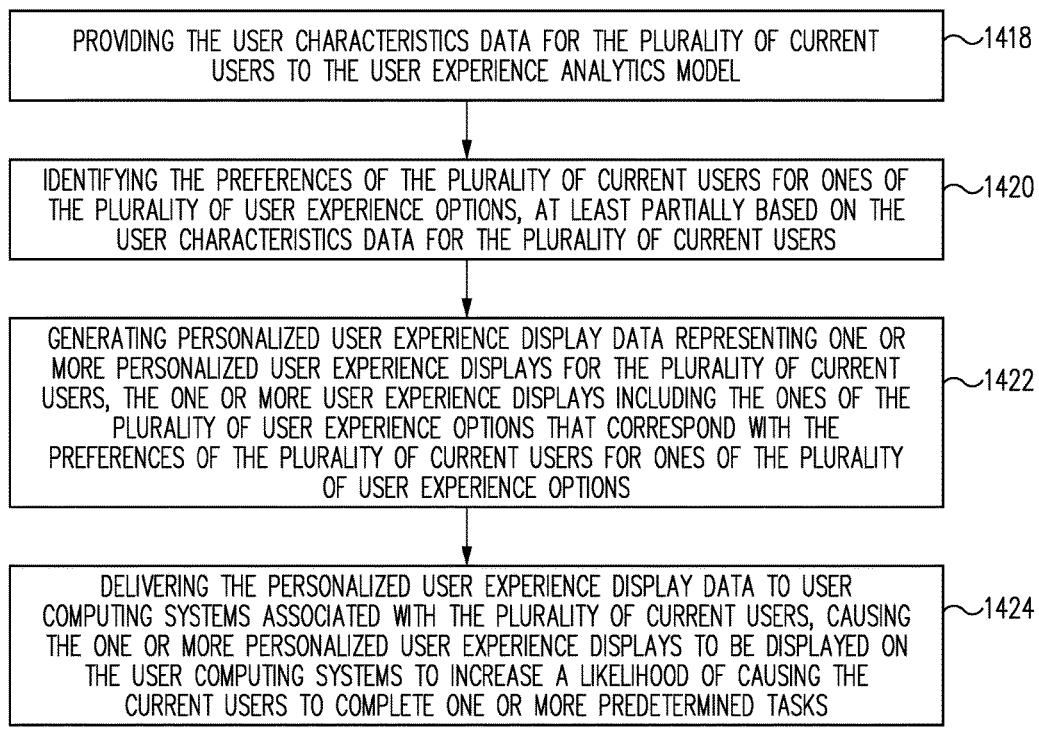

FIGS. 14A and 14B illustrate an example flow diagram of a process 1400 for adjusting analytics model characteristics to improve accuracy in determining users' preferences for user experience options, to support providing personalized user experiences to users, at least partially based on the users' preferences, according to one embodiment.

At operation 1402, the process includes providing a software system, according to one embodiment.

At operation 1404, the process includes receiving, with one or more computing systems associated with the software system, user characteristics data for a plurality of prior users of the software system, the user characteristics data for the plurality of prior users representing user characteristics for the plurality of prior users, according to one embodiment.

At operation 1406, the process includes storing the user characteristics data for the plurality of prior users in a section of memory for user characteristics data for the plurality of prior users that is accessible by the one or more computing systems, according to one embodiment.

At operation 1408, the process includes generating a data structure of user experience options data representing a plurality of user experience options that are available for delivery to users of the software system, according to one embodiment.

At operation 1410, the process includes storing the user experience options data in a section of memory for the user experience options data that is accessible by the one or more computing systems, according to one embodiment.

At operation 1412, the process includes providing a user experience analytics model to identify preferences of a plurality of current users for ones of the plurality of user experience options, at least partially based on preferences of the plurality of prior users for ones of the plurality of user experience options, according to one embodiment. The user experience analytics model includes a decision tree for identifying the preferences of the plurality of current users for ones of the plurality of user experience options, according to one embodiment.

At operation 1414, the process includes generating the decision tree with a plurality of nodes, each of the plurality of nodes being associated with one of a plurality of segments of prior users, each of the plurality of segments of prior users being a subset of the plurality of prior users, according to one embodiment. Generating the decision tree includes determining edge logic between parent nodes of the plurality of nodes and children nodes of the plurality of nodes, the edge logic being based on user characteristics of the plurality of prior users, each of the plurality of nodes being associated with one or more of the preferences of the plurality of prior users for ones of the plurality of user experience options, according to one embodiment. Generating the decision tree includes determining whether to split each of the plurality of nodes at least partially based on one of a local stop probability and a minimum segment size threshold, according to one embodiment.

At operation 1416, the process includes receiving user characteristics data for the plurality of current users, the user characteristics data for the plurality of current users representing user characteristics for the plurality of current users, according to one embodiment.

At operation 1418, the process includes providing the user characteristics data for the plurality of current users to the user experience analytics model, according to one embodiment.

At operation 1420, the process includes identifying the preferences of the plurality of current users for ones of the plurality of user experience options, at least partially based on the user characteristics data for the plurality of current users, according to one embodiment.

At operation 1422, the process includes generating personalized user experience display data representing one or more personalized user experience displays for the plurality of current users, the one or more user experience displays including the ones of the plurality of user experience options that correspond with the preferences of the plurality of current users for ones of the plurality of user experience options, according to one embodiment.

At operation 1424, the process includes delivering the personalized user experience display data to user computing systems associated with the plurality of current users, causing the one or more personalized user experience displays to be displayed on the user computing systems to increase a likelihood of causing the current users to complete one or more predetermined tasks, according to one embodiment.

By adapting analytics model characteristics to improve accuracy in determining users' preferences for user experience options, to support providing personalized user experiences to users, at least partially based on the users' likely preferences, implementation of embodiments of the present disclosure allows for significant improvement to the fields of user experience, electronic tax return preparation, data analytics, data modeling, data collection, and data processing, according to one embodiment. As one illustrative example, by adapting analytics model characteristics to improve accuracy in determining users' preferences for user experience options, to support providing personalized user experiences to users, at least partially based on the users' likely preferences, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by adapting analytics model characteristics to improve accuracy in determining users' preferences for user experience options, to support providing personalized user experiences to users, at least partially based on the users' likely preferences, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, based on their user characteristics, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

In accordance with an embodiment, a computer system implemented method adjusts analytics model characteristics to reduce uncertainty in determining user preferences for user experience options, to support providing personalized user experiences to users, at least partially based on the user preferences. The method includes providing a software system, according to one embodiment. The method includes receiving, with one or more computing systems associated with the software system, user characteristics data for a plurality of prior users of the software system, the user characteristics data for the plurality of prior users representing user characteristics for the plurality of prior users, according to one embodiment. The method includes storing the user characteristics data for the plurality of prior users in a section of memory for user characteristics data for the plurality of prior users that is accessible by the one or more computing systems, according to one embodiment. The method includes generating a data structure of user experience options data representing a plurality of user experience options that are available for delivery to users of the software system, according to one embodiment. The method includes storing the user experience options data in a section of memory for the user experience options data that is accessible by the one or more computing systems, according to one embodiment. The method includes providing a user experience analytics model to identify preferences of a plurality of current users for ones of the plurality of user experience options, at least partially based on preferences of the plurality of prior users for ones of the plurality of user experience options, according to one embodiment. The user experience analytics model includes a decision tree for identifying the preferences of the plurality of current users for ones of the plurality of user experience options, according to one embodiment. The method includes generating the decision tree with a plurality of nodes, each of the plurality of nodes being associated with one of a plurality of segments of prior users, each of the plurality of segments of prior users being a subset of the plurality of prior users, according to one embodiment. Generating the decision tree includes determining edge logic between parent nodes of the plurality of nodes and children nodes of the plurality of nodes, the edge logic being based on user characteristics of the plurality of prior users, each of the plurality of nodes being associated with one or more of the preferences of the plurality of prior users for ones of the plurality of user experience options, according to one embodiment. Generating the decision tree includes determining whether to split each of the plurality of nodes at least partially based on one of a local stop probability and a minimum segment size threshold, according to one embodiment. The method includes receiving user characteristics data for the plurality of current users, the user characteristics data for the plurality of current users representing user characteristics for the plurality of current users, according to one embodiment. The method includes providing the user characteristics data for the plurality of current users to the user experience analytics model, according to one embodiment. The method includes identifying the preferences of the plurality of current users for ones of the plurality of user experience options, at least partially based on the user characteristics data for the plurality of current users, according to one embodiment. The method includes generating personalized user experience display data representing one or more personalized user experience displays for the plurality of current users, the one or more user experience displays including the ones of the plurality of user experience options that correspond with the preferences of the plurality of current users for ones of the plurality of user experience options, according to one embodiment. The method includes delivering the personalized user experience display data to user computing systems associated with the plurality of current users, causing the one or more personalized user experience displays to be displayed on the user computing systems to increase a likelihood of causing the current users to complete one or more predetermined tasks, according to one embodiment.

In accordance with an embodiment, a computer system implemented method adjusts analytics model characteristics to reduce uncertainty in determining user preferences for user experience options, to support providing personalized user experiences to users, at least partially based on the user preferences. The method includes training a user experience analytics model, according to one embodiment. Training includes retrieving, with one or more processors, a plurality of existing user characteristics data for a plurality of existing users of a software system that provided services to the plurality of existing users, the plurality of existing user characteristics data representing a plurality of existing user characteristics for the plurality of existing users, according to one embodiment. Training includes identifying user experience options data representing user experience options received by the plurality of existing users from the software system, the user experience options being applicable to current user experiences in the software system to modify the current user experiences to improve a likelihood of causing particular user responses in the software system by at least some of a plurality of current users of the software system, according to one embodiment. Training includes analyzing, with the one or more processors, the plurality of existing user characteristics data and the user experience options data to generate a decision tree having nodes that correlate the plurality of existing user characteristics with the user experience options that were received by the plurality of existing users prior to the plurality of existing users performing at least some of the particular user responses, according to one embodiment. Each of the nodes is associated with one of a plurality of segments of existing users, according to one embodiment. Training includes selectively splitting the nodes to increase a resolution of the decision tree with which the decision tree determines user preferences for the user experience options, at least partially based on one of a local stop probability and a minimum segment size threshold, according to one embodiment. The method includes applying current user characteristics data representing current user characteristics of the plurality of current users to the user experience analytics model to identify user preferences for the plurality of current users for the user experience options, according to one embodiment. The method includes generating personalized user experience display data including the user preferences for the plurality of current users for the user experience options identified by the user experience analytics model, according to one embodiment. The method includes delivering the personalized user experience display data to user computing systems to improve the likelihood of causing particular user responses in the software system by at least some of the plurality of current users of the software system, according to one embodiment.

In accordance with an embodiment, a system adjusts analytics model characteristics to reduce uncertainty in determining user preferences for user experience options, to support providing personalized user experiences to users, at least partially based on the user preferences. The system includes a memory that stores information of users of a software system, according to one embodiment. The system includes one or more processors communicatively coupled to the memory to perform operations on the information of users of the software system, according to one embodiment. The system includes a system engine that receives, with the one or more processors, current user characteristics data and current user responses data from a plurality of current users, wherein the system engine stores the user characteristics data and the user responses data in the memory, according to one embodiment. The system includes a user experience analytics model training module that uses at least one of a local stop probability and a minimum segment size threshold to define a decision tree used by a user experience analytics model, according to one embodiment. The system includes a decision engine that receives, with the one or more processors, the user characteristics data from the memory and applies the user characteristics data to the user experience analytics model to determine which of a plurality of user experience options to provide to users having user characteristics that are represented by the current user characteristics data, the user experience analytics model being configured to identify selected ones of the plurality of user experience options at least partially based on the current user characteristics data, the selected ones of the plurality of user experience options being probabilistically likely to cause the users to perform a particular task, according to one embodiment. The system engine is configured to integrate the selected ones of the plurality of user experience options into user experience displays, and to host the user experience displays to provide personalized user experiences to the users at least partially based on the current user characteristics of the users to increase a likelihood that the users perform the particular task during user sessions with the software system, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer system implemented method for adjusting analytics model characteristics to reduce uncertainty in determining user preferences for user experience options, to support providing personalized user experiences to users, at least partially based on the user preferences, comprising:
   providing a software system;
   receiving, with one or more computing systems associated with the software system, user characteristics data for a plurality of prior users of the software system, the user characteristics data for the plurality of prior users representing user characteristics for the plurality of prior users;
   storing the user characteristics data for the plurality of prior users in a section of memory for user characteristics data for the plurality of prior users that is accessible by the one or more computing systems;
   generating a data structure of user experience options data representing a plurality of user experience options that are available for delivery to users of the software system;
   storing the user experience options data in a section of memory for the user experience options data that is accessible by the one or more computing systems;
   providing a user experience analytics model to identify preferences of a plurality of current users for ones of the plurality of user experience options, at least partially based on preferences of the plurality of prior users for ones of the plurality of user experience options,
   wherein the user experience analytics model includes a decision tree for identifying the preferences of the plurality of current users for ones of the plurality of user experience options;
   generating the decision tree with a plurality of nodes, each of the plurality of nodes being associated with one of a plurality of segments of prior users, each of the plurality of segments of prior users being a subset of the plurality of prior users,
   wherein generating the decision tree includes determining edge logic between parent nodes of the plurality of nodes and children nodes of the plurality of nodes, the edge logic being based on user characteristics of the plurality of prior users, each of the plurality of nodes being associated with one or more of the preferences of the plurality of prior users for ones of the plurality of user experience options,
   wherein generating the decision tree includes determining whether to split each of the plurality of nodes at least partially based on one of a local stop probability and a minimum segment size threshold;
   receiving user characteristics data for the plurality of current users, the user characteristics data for the plurality of current users representing user characteristics for the plurality of current users;
   providing the user characteristics data for the plurality of current users to the user experience analytics model;
   identifying the preferences of the plurality of current users for ones of the plurality of user experience options, at least partially based on the user characteristics data for the plurality of current users;
   generating personalized user experience display data representing one or more personalized user experience displays for the plurality of current users, the one or more user experience displays including the ones of the plurality of user experience options that correspond with the preferences of the plurality of current users for ones of the plurality of user experience options; and
   delivering the personalized user experience display data to user computing systems associated with the plurality of current users, causing the one or more personalized user experience displays to be displayed on the user computing systems to increase a likelihood of causing the current users to complete one or more predetermined tasks.

2. The computer system implemented method of claim 1, wherein the software system is selected from a group of software system consisting of: a tax return preparation system; a personal finances management system; and a business finances management system.

3. The computer system implemented method of claim 1, wherein the local stop probability is a likelihood that an effective performance of one of the plurality of nodes is greater than an effective performance of two children nodes from the one of the plurality of nodes, without consideration for an effective performance of potential additional descendant nodes from the two children nodes.

4. The computer system implemented method of claim 3, wherein the effective performance of one of the plurality of nodes is associated with a distribution of the plurality of user experience options among ones of the plurality of prior users of the one of the plurality of segments of prior users associated with the one of the plurality of nodes.

5. The computer system implemented method of claim 1, wherein the minimum segment size threshold is a predetermined static number of users.

6. The computer system implemented method of claim 1, wherein the minimum segment size threshold is a statistically determined number of users.

7. The computer system implemented method of claim 1, further comprising:
   determining a quantity of users for each of the plurality of segments of prior users;
   comparing the quantity of users to the minimum segment size threshold; and
   if the quantity of users for at least one of the plurality of segments of prior users is less than the minimum segment size threshold, aggregating one or more segments of prior users to increase an effective size of the one or more segments of prior users.

8. The computing system implemented method of claim 1, further comprising:
   determining a level of uncertainty of an ability of the decision tree to predict the preferences of the plurality of current users; and
   if the level of uncertainty is above a predetermined threshold, aggregating one or more segments of prior users or aggregating one or more segments of current users to increase an effective size of the one or more segments of prior users or of the one or more segments of current users to increase a likelihood of accurately determining the preferences of the plurality of current users for the plurality of user experience options.

9. The computer system implemented method of claim 1, wherein the user experience options data is selected from a group of user experience options data consisting of:
   data representing a user interface element;
   data representing a location of a user interface element in the user experience display;
   data representing a web page;
   data representing a series of web pages;
   data representing one or more particular questions;
   data representing a sequence of questions; and
   data representing one of a number of predictive models, each of the number of predictive models configured to prioritize content for the software system based on the user characteristics data.

10. The computer system implemented method of claim 1, wherein the user characteristics data for the plurality of prior users and the user characteristics data for the plurality of current users are selected from a group of user characteristics data consisting of:
    data indicating user computing system characteristics;
    data indicating time-related information;
    data indicating geographical information;
    data indicating external and independent marketing segments;
    data identifying an external referrer of the user;
    data indicating a number of visits made to a service provider website;
    data indicating an age of the user;
    data indicating an age of a spouse of the user;
    data indicating a zip code;
    data indicating a tax return filing status;
    data indicating state income;
    data indicating a home ownership status;
    data indicating a home rental status;
    data indicating a retirement status;
    data indicating a student status;
    data indicating an occupation of the user;
    data indicating an occupation of a spouse of the user;
    data indicating whether the user is claimed as a dependent;
    data indicating whether a spouse of the user is claimed as a dependent;
    data indicating whether another taxpayer is capable of claiming the user as a dependent;
    data indicating whether a spouse of the user is capable of being claimed as a dependent;
    data indicating salary and wages;
    data indicating taxable interest income;
    data indicating ordinary dividend income;
    data indicating qualified dividend income;
    data indicating business income;
    data indicating farm income;
    data indicating capital gains income;
    data indicating taxable pension income;
    data indicating pension income amount;
    data indicating IRA distributions;
    data indicating unemployment compensation;
    data indicating taxable IRA;
    data indicating taxable Social Security income;
    data indicating amount of Social Security income;
    data indicating amount of local state taxes paid;
    data indicating whether the user filed a previous years' federal itemized deduction;
    data indicating whether the user filed a previous years' state itemized deduction;
    data indicating whether the user is a returning user to a tax return preparation system;
    data indicating an annual income;
    data indicating an employer's address;
    data indicating contractor income;
    data indicating a marital status;
    data indicating a medical history;
    data indicating dependents;
    data indicating assets;
    data indicating spousal information;
    data indicating children's information;
    data indicating an address;
    data indicating a name;
    data indicating a Social Security Number;
    data indicating a government identification;
    data indicating a date of birth;
    data indicating educator expenses;
    data indicating health savings account deductions;
    data indicating moving expenses;
    data indicating IRA deductions;
    data indicating student loan interest deductions;
    data indicating tuition and fees;
    data indicating medical and dental expenses;
    data indicating state and local taxes;
    data indicating real estate taxes;
    data indicating personal property tax;
    data indicating mortgage interest;
    data indicating charitable contributions;
    data indicating casualty and theft losses;
    data indicating unreimbursed employee expenses;
    data indicating an alternative minimum tax;
    data indicating a foreign tax credit;
    data indicating education tax credits;
    data indicating retirement savings contributions; and
    data indicating child tax credits.

11. The computer system implemented method of claim 1, wherein the predetermined task is selected from a group of predetermined tasks consisting of: completing a sequence of questions; paying for a product within the software system; completing a tax return preparation; filing a tax return from within the software system; entering personal information;

entering credit card information into the software system; and using the software system for longer than a predetermined period of time.

12. A computer system implemented method for adjusting analytics model characteristics to reduce uncertainty in determining user preferences for user experience options, to support providing personalized user experiences to users, at least partially based on the user preferences, comprising:
    training a user experience analytics model, including:
        retrieving, with one or more processors, a plurality of existing user characteristics data for a plurality of existing users of a software system that provided services to the plurality of existing users, the plurality of existing user characteristics data representing a plurality of existing user characteristics for the plurality of existing users;
        identifying user experience options data representing user experience options received by the plurality of existing users from the software system, the user experience options being appliable to current user experiences in the software system to modify the current user experiences to improve a likelihood of causing particular user responses in the software system by at least some of a plurality of current users of the software system;
        analyzing, with the one or more processors, the plurality of existing user characteristics data and the user experience options data to generate a decision tree having nodes that correlate the plurality of existing user characteristics with the user experience options that were received by the plurality of existing users prior to the plurality of existing users performing at least some of the particular user responses, wherein each of the nodes is associated with one of a plurality of segments of existing users; and
        selectively splitting the nodes to increase a resolution of the decision tree with which the decision tree determines user preferences for the user experience options, at least partially based on one of a local stop probability and a minimum segment size threshold;
    applying current user characteristics data representing current user characteristics of the plurality of current users to the user experience analytics model to identify user preferences for the plurality of current users for the user experience options;
    generating personalized user experience display data including the user preferences for the plurality of current users for the user experience options identified by the user experience analytics model; and
    delivering the personalized user experience display data to user computing systems to improve the likelihood of causing particular user responses in the software system by at least some of the plurality of current users of the software system.

13. The computer system implemented method of claim 12, further comprising:
    testing an effectiveness of the user experience analytics model to identify user preferences for the plurality of current users for the user experience options by:
        generating a first of the personalized user experience display data with a first of the user experience options for delivery to first ones of the plurality of current users;
        generating a second of the personalized user experience display data with a second of the user experience options for delivery to second ones of the plurality of current users; and
        comparing responses of the first ones of the plurality of current users to responses of the second ones of the plurality of current users to determine a more effective one of the first of the user experience options and a second of the user experience options,
            wherein the first ones of the plurality of current users and the second ones of the plurality of current users are users of one of a plurality of segments of current users,
            wherein each of the plurality of segments of current users is associated with one of the nodes of the decision tree.

14. The computer system implemented method of claim 12, wherein the software system is selected from a group of software system consisting of: a tax return preparation system; a personal finances management system; and a business finances management system.

15. The computer system implemented method of claim 12, wherein the local stop probability is a likelihood that an effective performance of one of the nodes is greater than an effective performance of two children nodes of the one of the nodes, without consideration for an effective performance of potential additional descendant nodes from the two children nodes.

16. The computer system implemented method of claim 12, wherein the minimum segment size threshold is a predetermined static number of users.

17. The computer system implemented method of claim 12, wherein the minimum segment size threshold is a statistically determined number of users.

18. The computer system implemented method of claim 12, further comprising:
    determining a quantity of users for each of the plurality of segments of existing users;
    comparing the quantity of users to the minimum segment size threshold; and
    if the quantity of users for at least one of the plurality of segments of existing users is less than the minimum segment size threshold, aggregating one or more segments of existing users to increase an effective size of the one or more segments of existing users, to reduce an uncertainty characteristic of the user experience analytics model.

19. The computer system implemented method of claim 12, wherein the particular user responses are selected from a group of user responses consisting of: completing a sequence of questions; paying for a product within the software system; completing a tax return preparation; filing a tax return from within the software system; entering personal information; entering credit card information into the software system; and using the software system for longer than a predetermined period of time.

20. A system for adjusting analytics model characteristics to reduce uncertainty in determining user preferences for user experience options, to support providing personalized user experiences to users, at least partially based on the user preferences, comprising:
    a memory that stores information of users of a software system;
    one or more processors communicatively coupled to the memory to perform operations on the information of users of the software system;
    a system engine that receives, with the one or more processors, current user characteristics data and current user responses data from a plurality of current users, wherein the system engine stores the user characteristics data and the user responses data in the memory;

a user experience analytics model training module that uses at least one of a local stop probability and a minimum segment size threshold to define a decision tree used by a user experience analytics model; and a decision engine that receives, with the one or more processors, the user characteristics data from the memory and applies the user characteristics data to the user experience analytics model to determine which of a plurality of user experience options to provide to users having user characteristics that are represented by the current user characteristics data, the user experience analytics model being configured to identify selected ones of the plurality of user experience options at least partially based on the current user characteristics data, the selected ones of the plurality of user experience options being probabilistically likely to cause the users to perform a particular task, wherein the system engine is configured to integrate the selected ones of the plurality of user experience options into user experience displays, and to host the user experience displays to provide personalized user experiences to the users at least partially based on the current user characteristics of the users to increase a likelihood that the users perform the particular task during user sessions with the software system.

21. The system of claim 20, wherein the local stop probability is a likelihood that an effective performance of one of a plurality of nodes of a decision tree of the user experience analytics model is greater than an effective performance of two children nodes of the one of the plurality of nodes, without consideration for an effective performance of potential additional descendant nodes from the two children nodes.

22. The system of claim 20, wherein the minimum segment size threshold is a predetermined number of users.

23. The system of claim 20, wherein the particular task is selected from a group of tasks consisting of: completing a sequence of questions; paying for a product within the software system; completing a tax return preparation; filing a tax return from within the software system; entering personal information; entering credit card information into the software system; and using the software system for longer than a predetermined period of time.

24. The system of claim 20, wherein the software system is selected from a group of software system consisting of: a tax return preparation system; a personal finances management system; and a business finances management system.

25. The system of claim 20, wherein the user experience analytics model includes a hierarchical decision tree, the hierarchical decision tree having a plurality of nodes, each of the plurality of nodes being associated with a distribution frequency rate for identifying the selected ones of the user experience options at least partially based on segments of users, the segments of users having one or more user characteristics in common.

* * * * *